US005355158A

United States Patent [19]

Inada et al.

[11] Patent Number: 5,355,158

[45] Date of Patent: Oct. 11, 1994

[54] INK JET APPARATUS AND METHOD OF RECOVERING INK JET HEAD

[75] Inventors: Genji Inada, Kawasaki; Hiroshi Tajika, Yokohama; Noribumi Koitabashi, Yokohama; Hitoshi Sugimoto, Yokohama; Atsushi Arai, Kawasaki; Miyuki Matsubara, Tokyo, all of Japan

[73] Assignee: Canon Kabushiki Kaisha, Tokyo, Japan

[21] Appl. No.: 637,633

[22] Filed: Jan. 4, 1991

[30] Foreign Application Priority Data

Jan. 11, 1990 [JP] Japan .................................. 2-4366
Jan. 25, 1990 [JP] Japan .................................. 2-15705
Apr. 11, 1990 [JP] Japan .................................. 2-95484

[51] Int. Cl.[5] .................................. G01D 15/18
[52] U.S. Cl. .................................. 347/4
[58] Field of Search ................ 346/140 R, 1.1, 139 R, 346/75

[56] References Cited

U.S. PATENT DOCUMENTS 4,126,868 11/1978 Kirner .......................... 346/140 R
4,313,124 1/1982 Hara .......................... 346/140 R
4,317,124 2/1982 Shirato et al. .......................... 346/140 R
4,345,262 8/1982 Shirato et al. .......................... 346/140 R
4,367,479 1/1983 Bower .......................... 346/140 R
4,413,268 11/1983 Bentin .......................... 346/140 R
4,459,600 7/1984 Sato et al. .......................... 346/140 R
4,463,359 7/1984 Ayata et al. .......................... 346/1.1
4,540,997 9/1985 Biggs et al. .......................... 346/140 R
4,542,389 9/1985 Allen .......................... 346/140 R
4,558,333 12/1985 Sugitani et al. .......................... 346/140 R
4,723,129 2/1988 Endo et al. .......................... 346/1.1
4,740,796 4/1988 Endo et al. .......................... 346/1.1
4,967,204 10/1990 Terasawa et al. .......................... 346/1.1

FOREIGN PATENT DOCUMENTS 54-56847 5/1979 Japan .
54-101322 8/1979 Japan .
57-84857 5/1982 Japan .
57-207066 12/1982 Japan .
59-123670 7/1984 Japan .
59-138461 8/1984 Japan .
60-71260 4/1985 Japan .
61-35966 2/1986 Japan .

*Primary Examiner*—Benjamin R. Fuller
*Assistant Examiner*—Eric Frahm
*Attorney, Agent, or Firm*—Fitzpatrick, Cella, Harper & Scinto

[57] ABSTRACT

An ink jet apparatus includes an ink jet head having in energy generator which car, generate energy employed for discharging ink as a droplet from a discharge port, and a control unit for controlling the energy generated from the energy generator so as to remove ink droplets, which adhere to a discharge port surface, by spreading the meniscus of the ink projecting from the discharge port on the discharge port surface. The apparatus is therefore capable of removing floating ink mist particles which adhere to the ink jet head.

28 Claims, 18 Drawing Sheets

INK JET APPARATUS AND METHOD OF RECOVERING INK JET HEAD

BACKGROUND OF THE INVENTION

1. Field of the Invention

The present invention relates to an ink jet apparatus for recording in which ink is discharged as a droplet from a discharge port of a recording head by driving energy generating means provided corresponding to the discharge port on the basis of the record information transmitted. The present invention also relates to a method of recovering in ink jet head.

Particularly, the present invention relates to an ink jet apparatus in which, in an ink jet recording method, the intensity of energy employed for discharging ink as a droplet from a discharge port (referred to as "an orifice" hereinafter) is controlled so that ink which is not discharged as a droplet is used for dummy wiping, and to a method of recovering an ink jet head.

2. Related Background Art

Recording apparatuses such as printers, copying machines, facsimiles and the like are designed so as to record images comprising dot patterns on recording materials such as paper, thin plastic plates and the like by driving the energy generating means of recording heads on the basis of the image information transmitted thereto.

Such recording apparatuses are divided into an ink jet type, a wire dot type, a thermal type, a laser beam type and the like according to various recording methods. In the ink jet type (ink jet recording apparatus) recording is performed by discharging ink (recording solution) as droplets from the discharge ports of a recording head and causing the droplets to adhere to a recording material such as paper.

The above ink jet recording apparatus has an advantage in that, since ink is discharged as small droplets, high-precision images can be recorded a% high speed.

However, the influence of the ink mist produced when ink droplets are discharged from discharge ports or when ink droplets are caused to adhere to a recording material increases with an increase in the density of discharge ports.

Namely, an increase in the number of discharge ports per unit area of the discharge port surface of a recording head results in an increase in the frequency with which the floating mist particles generated between the recording head and the recording material (a recording medium such as paper, a thin plastic plate or the like) and in the vicinity thereof adhere to a portion of the discharge port surface which is near the discharge ports of the recording head.

FIG. 1 is a schematic sectional view showing a normal state (upper side) of an ink droplet discharged and a state (lower side) of an ink droplet discharged when an ink mist particle 15 adheres to a discharge port surface 11.

In FIG. 1, when the ink mist particle 15 adheres to a portion of the discharge port surface 11 near a discharge port 6*a* which is provided therein and communicates with a liquid passage 6, the ink mist particle 15 causes the bending of the direction of the droplet 14 discharged from the discharge port, or, in some cases, the occurrence of a so-called sagging non-discharge phenomenon which prevents the discharge of droplets from the discharge port. This causes a deterioration in quality of the image recorded.

Particularly, when the volume of each droplet is reduced in order to obtain a high-precision image, the above-described tendency is remarkable.

Some methods have been therefore proposed for preventing or removing the adhesion of a floating ink mist particle to a discharge port surface.

Known examples of such methods include a method of providing an ink mist particle adhesion preventing member between a recording head and a recording material (Japanese Patent Laid-Open No. 54-101322), a method of providing a member for positively absorbing a mist (Japanese Patent Laid-Open No. 57-207066), a method of removing a floating ink mist particle by forming an air stream using a fan or the like (Japanese Patent Laid-Open No. 57-84857) and the like.

In addition, in order to remove unnecessary ink, including a floating ink mist particle, so as to prevent a discharge failure of ink and recover normal discharge, for example, the recovery device used in an ink jet recording apparatus (referred to as "a liquid jet recording apparatus" hereinafter) is provided with a blade made of an elastic material for cleaning a plurality of discharge ports on an ink jet head. For example, the blade is formed so as to slide on a discharge surface while moving relatively to the discharge ports for the purpose of cleaning the discharge ports and the circumference thereof.

Typical examples of the structures of such apparatuses include the following:

1) All the discharge ports of an apparatus are wiped by using a single blade.
2) Each of a plurality of heads is provided with an exclusive blade.
3) A member for cleaning a blade is provided in the apparatus body.

However, there is a problem from the technical viewpoint in that the employment of one of the above methods causes an increase in the size of a recording apparatus.

Further, since the distance between the ink jet recording head and the discharge port surface is generally as small as 2 to 3 mm, it is very difficult to provide the member for removing or preventing an ink mist particle in the portion where a high-density ink mist frequently occurs.

The above examples also have the following problems

1) When all the discharge port surfaces of a plurality of ink jet heads, which are provided corresponding to respective colors, are cleaned by using a single blade, the quality of an image is deteriorated by mixing of the ink colors of the heads. If wiping is performed during printing, the total printing time is increased, and thus the throughput of printing is decreased.
2) When the discharge port surface of each of a plurality of ink jet heads is cleaned by using an exclusive blade, although a deterioration in quality of the image formed, which is caused by mixing of ink colors, can be prevented, the adhesion of ink to the discharge port surfaces, which is caused by wiping, causes the occurrence of a discharge failure including non-discharge or deviation in the direction of discharge of ink, thereby adversely deteriorating the discharge stability.

3) The discharge stability can be further improved by providing a member for cleaning a blade in an apparatus. However, since a new member for cleaning the blade is provided in the apparatus, the cost of the apparatus is increased, and the need for the time for cleaning the blade causes a decrease in throughput of printing. In addition, the abrasion of the discharge port surfaces, which is caused by sliding of the wiping blade on the discharge port surfaces of the ink jet heads, causes discharge failure including non-discharge, deviation in the discharge direction of ink or the like, thereby adversely deteriorating the discharge stability.

SUMMARY OF THE INVENTION

The present invention has been achieved in consideration of the above technical problems, and it is an object of the present invention to provide an ink jet recording apparatus and an ink jet head recovering method which require no extra space and which are capable of removing floating ink mist maintaining adhering to a discharge port surface within a short time and constantly the good quality of the recorded image.

It is another object of the present invention to provide an ink jet apparatus and an ink jet head recovering method which have the effect of sufficiently wiping the wet ink droplets generated on a discharge port surface when ink is discharged, without providing a cleaning member (blade) made of an elastic material, and which are capable of preventing a reduction in throughput for the printing time and the occurrence of ink color mixing, a stain on an ink jet head, or abrasion of the ink jet head, all of which are caused by wiping.

It is a further object of the present invention to provide an ink jet apparatus comprising an ink jet head having an energy generator which can generate energy utilized for discharging ink as a droplet, and a control means for controlling the energy generated by the energy generator so that an ink droplet adhering to the discharge port surface can be removed by spreading the meniscus of the ink projecting from the discharge port on the discharge port surface of the ink jet head having the discharge port provided thereon.

It is still a further object of the present invention to provide an ink jet apparatus comprising an ink jet head having a recording discharge port for discharging ink as a droplet, an energy generator which can generate energy employed for discharging the ink as a droplet, and a dummy discharge port for removing an ink droplet adhering to the discharge port surface having the recording discharge port provided thereon; a carriage which moves together with the ink jet head loaded thereon; and an ink supply tube for supplying ink to the dummy discharge port, wherein the meniscus of the ink in the dummy discharge port is vibrated by employing a pressure variation of the ink in the ink supply tube, which is produced by the movement of the carriage, so that the ink droplet adhering to the discharge port surface is removed.

It is a further object of the present invention to provide a method of recovering an ink jet head comprising spreading the meniscus of the ink which projects from a discharge port of the ink jet head on a discharge port surface having the discharge port provided thereon so as to remove the ink droplet adhering to the discharge port surface.

DESCRIPTION OF THE PREFERRED EMBODIMENTS

Embodiment 1

An embodiment of the present invention is described in detail below with reference to FIGS. 2 to 5.

Figure 1:
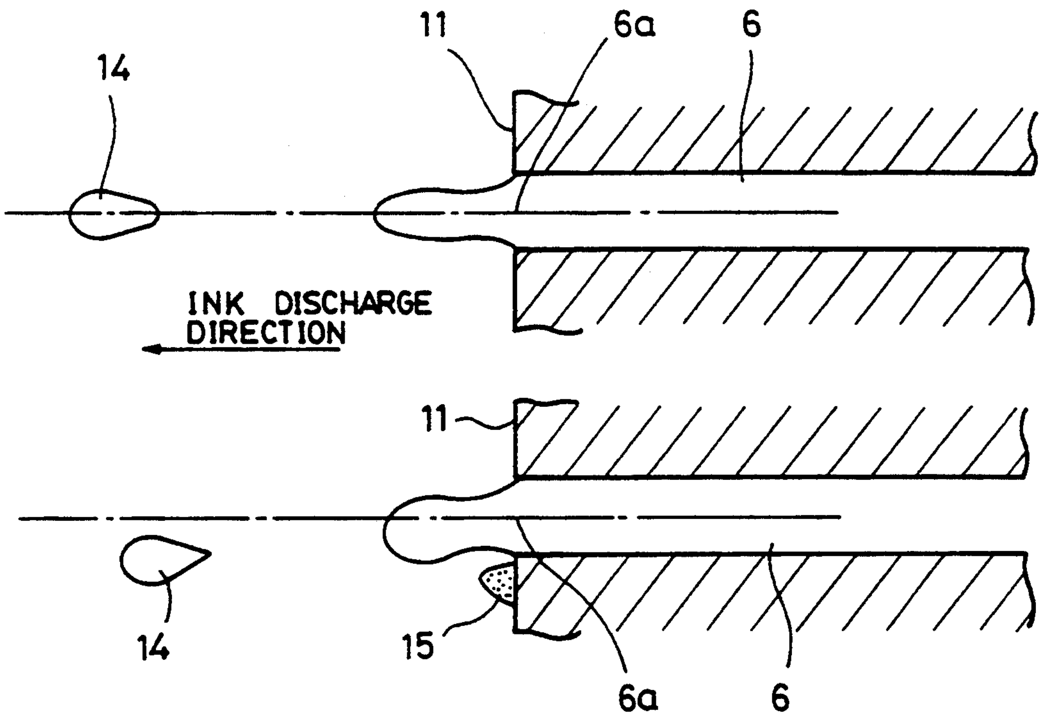
FIG. 1 PRIOR ART
FIG. 1 is a schematic sectional view showing a normal state (upper side) of an ink droplet discharged and a state (lower side) of an ink droplet discharged when an ink must particle adheres to a discharge port surface.
Figure 2:
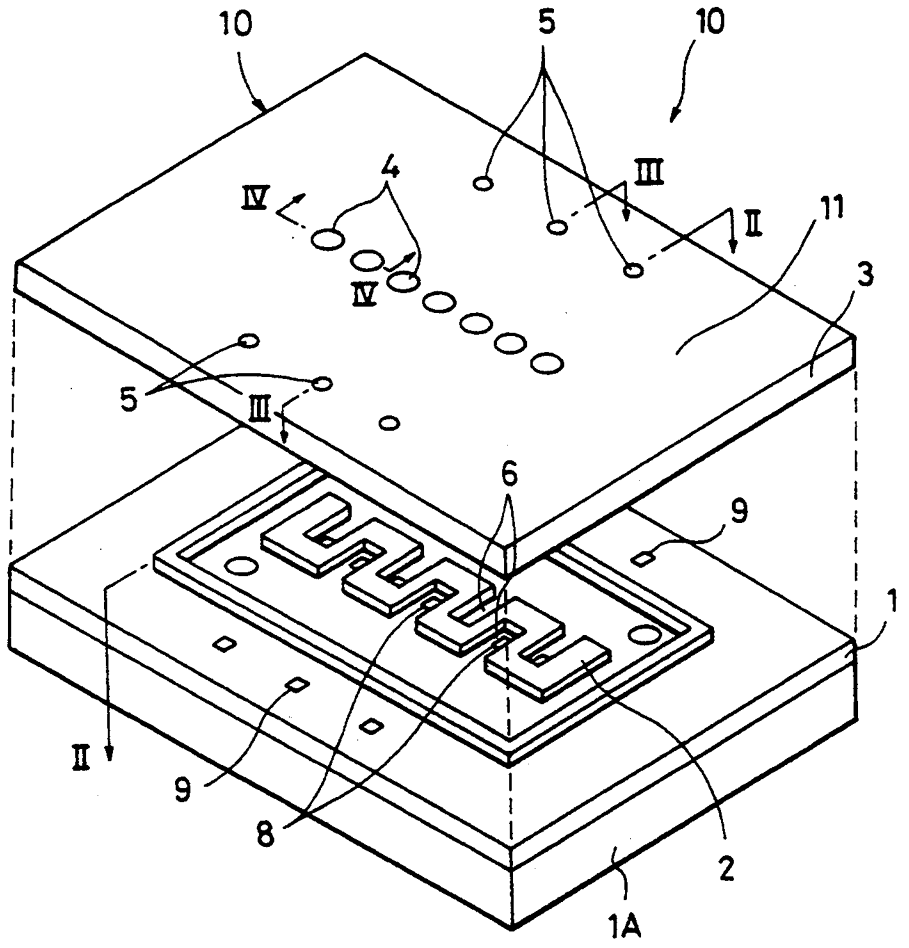
FIG. 2 is an exploded perspective view of an ink jet recording head suitably used in an ink jet recording apparatus in accordance with the present invention.
Figure 3:
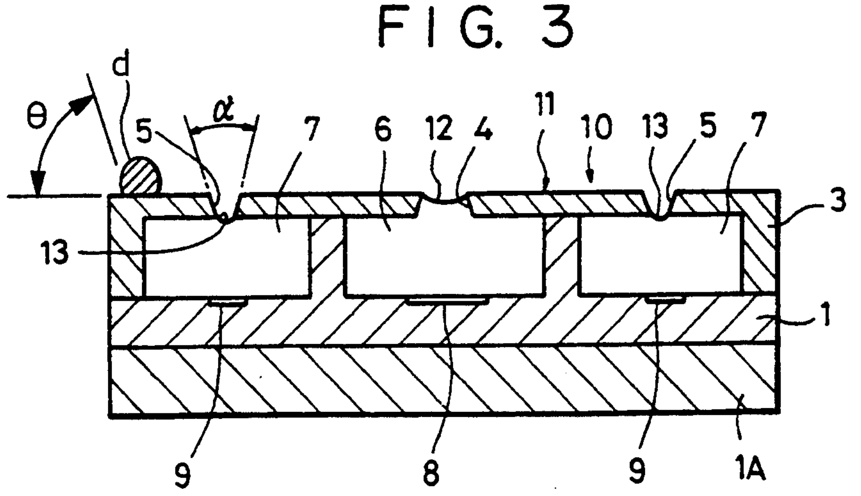
FIG. 3 is a sectional view taken along line II—II in FIG. 2.
Figure 4A:
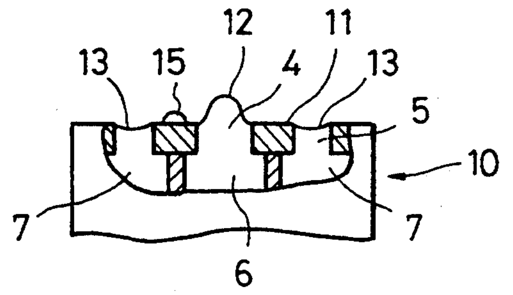
FIGS. 4(*a*) to 4(*e*) are sectional view of a dummy discharge port taken along line III—III in FIG. 2 showing the operation of removing an ink mist particle.
Figure 4B:
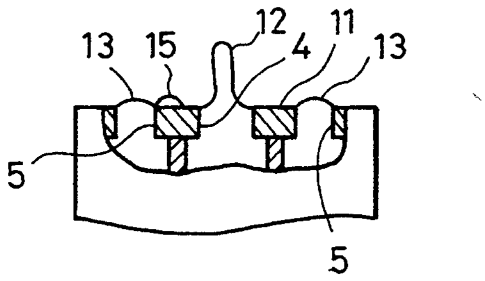
Figure 4C:
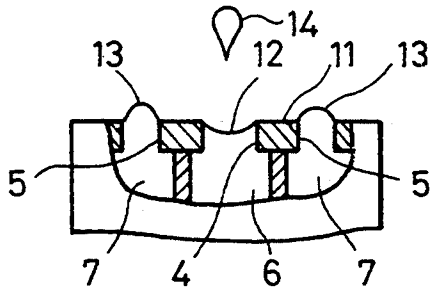
Figure 4D:
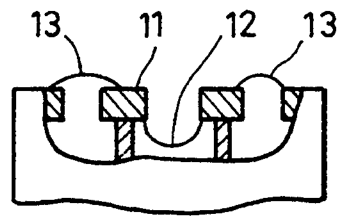
Figure 4E:
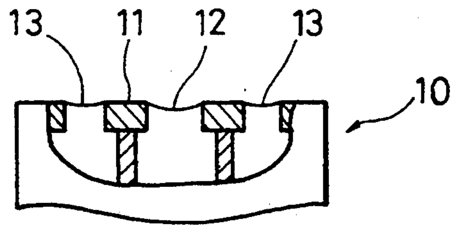
Figure 5A:
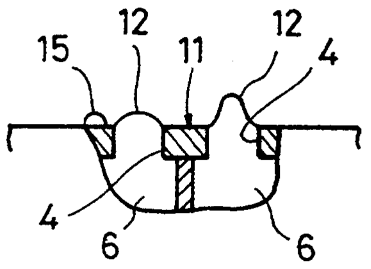
FIGS. 5(*a*) to 5(*g*) are sectional view of a recording discharge port taken along line IV—IV in FIG. 2 showing the operation of removing an ink mist particle.
Figure 5B:
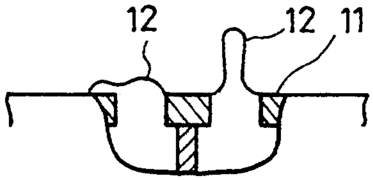
Figure 5C:
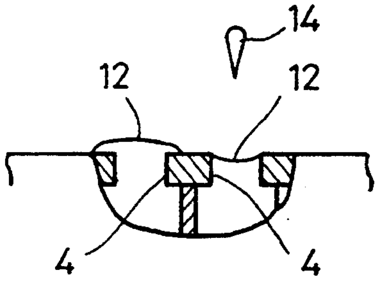
Figure 5D:
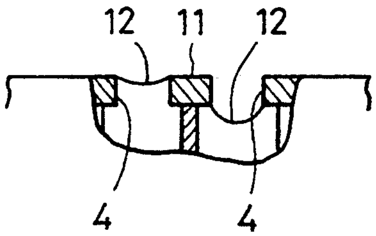
Figure 5E:
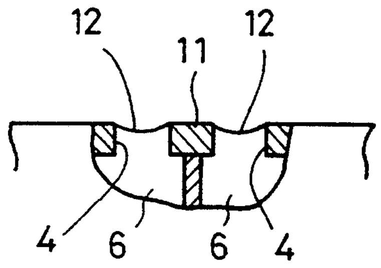
Figure 5F:
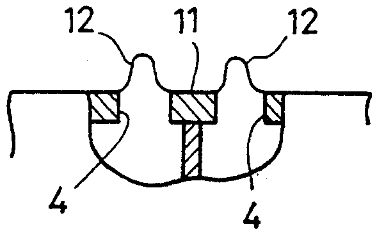
Figure 5G:
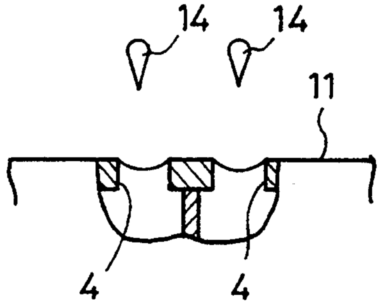

FIG. 2 is an exploded perspective view of a recording head 10 provided in an ink jet recording apparatus in accordance with an embodiment of the present invention. FIG. 3 is a sectional view taken along line II—II in FIG. 2.

In FIGS. 2 and 3, a liquid passage wall 2 is formed on a substrate 1 joined to a base plate 1A by using a photosensitive resin, and recording discharge ports 4 and dummy discharge ports 5 are formed in a discharge port plate 3.

Each of the recording discharge ports 4 communicates with the corresponding liquid passage 6, and each of the dummy discharge ports 5 communicates with the corresponding liquid passage 7.

The plurality of discharge ports 4 are selectively driven so as to discharge ink droplets (droplets) for recording. The dummy discharge ports 5 do not discharge ink droplets for recording, but they are provided for removing an ink mist particle or droplet d adhering to the discharge pore surface 11 by projecting a meniscus 13 from each discharge port, as described below.

In FIG. 3, assuming that the angle where an edge of the ink droplet contacts the material (for example, resin, glass, ceramics or the like) of the discharge port plate 3 is $\theta$, the angular aperture $\alpha$ of each of the dummy discharge ports 5 is preferably set to a value which satisfies the following relation:

$$\pi-2\theta<\alpha$$

When the angular aperture $\alpha$ of each of the dummy discharge ports 5 is set as described above, it is possible to obtain a shape of each discharge port which allows the meniscus 13 of each of the discharge ports 5 to outwardly project from the discharge port surface (face surface) 11. This shape also allows the projecting ink to easily vibrate with an amplitude which permits the ink to temporarily cover the vicinity of each discharge port.

On the substrate 1 are disposed heating elements (referred to as "heater" hereinafter) 8 each serving as energy generating means for generating energy utilized for discharging droplets (ink droplets) for recording, and heating elements 9 each serving as energy generating means for generating energy utilized for vibrating the meniscus 13 of each of the dummy discharge ports 5, as described above.

The heating elements 8 and 9 are disposed at positions opposite to the recording discharge ports 4 and the dummy discharge ports 5, respectively.

The heating elements 9 respectively opposite to the dummy discharge ports 5 are also used for heating and keeping the ink in the liquid passage 7 warm at a stand-by time during recording by the recording head 10. The heating elements 9 are also designed so as to generate energy to an extent which allows the meniscus 13 formed in each of the dummy discharge ports 5 to outwardly project from the discharge port and which prevents the separation and discharge of the ink as droplets.

Reference numeral 12 in FIG. 3 denotes the meniscus of each of the recording discharge ports 4.

FIGS. 4 and 5 are drawings respectively showing the operation of the above-described ink jet recording head 10. FIG. 4 is a sectional view taken along line III—III in FIG. 2, and FIG. 5 is a sectional view taken along line IV—IV in FIG. 2.

In FIG. 4, when a record signal is applied as a voltage pulse, vapor bubbles are generated on the heating elements 8, and the meniscus 12 is projected from each of the discharge ports 4, as shown in FIG. 4(*a*).

The meniscus 13 formed at each of the dummy discharge ports 5 project outwardly therefrom (above the discharge port surface 11) by driving the heating elements 9 immediately before the ink droplet is separated and injected from each of the discharge ports 4, as shown in FIG. 4(*b*).

After the state where the droplet 14 separated from each discharge port 4 is discharged, as shown in FIG. 4(*c*), the meniscus 13 at each dummy discharge port 5 reaches a state where it projects to the maximum extent, as shown in FIG. 4(*d*). In the state shown in FIG. 4(*d*), the vicinity of each of the discharge ports 4, 5 on the discharge port surface 11 is covered with the ink (recording solution) so that the ink mist particle lb adhering to the discharge port surface 11 is enveloped into the projecting ink.

The ink projecting above the discharge port surface 11 is then sucked (withdrawn) by the liquid passage 7 through each dummy discharge port 5, as the pressure in the liquid passage 7 of each dummy discharge port 5 decreases, and reaches the state shown in FIG. 4(*e*). In the state shown in FIG. 4(*e*), the normal menisci 12, 13 are again formed at each of the discharge ports 4, 5, respectively.

When the process described above with reference to FIG. 4 is repeated corresponding to the driving conditions of the ink jet recording head 10, the ink mist particle 15 which adheres to the discharge port surface 11 of the ink jet recording head 10 can be removed.

In this way, the ink jet recording head permits the ink mist particle which adheres to the discharge port surface 11 to be surely removed by driving the dummy discharge ports 5 so that the meniscus 13 projects from the discharge port surface 11, and the vibrations make the ink project with an amplitude which allows the ink to cover the vicinity of each discharge port.

In order to increase the effect of removing the ink mist particle 15, it is preferable to start the driving of the heating elements 9 respectively corresponding to the dummy discharge ports 5 between the time from the start of driving of the heating elements 8 by the application of a voltage pulse to the heating elements 8. It is also preferable to set the driving timing of the heating elements 9 so as to complete the process of removing the ink mist particle 15 by suction (negative pressure).

FIG. 5 is a sectional view taken along line IV—IV in FIG. 2 which schematically shows the operation of removing the ink mist particle 15 by driving the energy generating means 8 of the recording discharge ports 4.

In FIG. 5, both the discharge ports 4, 4 are recording discharge ports and are capable of discharging the droplets 14 for recording, as shown in FIG. 5(*g*).

In FIGS. 5(*a*) to 5(*e*), one (the right) of the discharge ports 4 discharges a droplet for normal recording, while the other (the left) discharge port 4 does not discharge the droplet 14. The energy generating means 8 of the left discharge port 4 is driven to an extent which allows the meniscus to outwardly project and temporarily cover the vicinity of the discharge pore 4 so as to absorb or envelope the ink mist particle 15 on the discharge port surface 11, like the above-described dummy discharge ports 5.

As shown in FIGS. 5(*a*) to 5(*c*), the heating element 8 for the left discharge port 4 which absorbs the ink mist particle 15 is driven slightly after or at the earliest at the same time as the driving timing of the heating element 8 for the discharge port 4 which discharges the ink droplet 14 for recording.

In this case, the left heating element 8 is driven so as to apply to the ink energy which does not allow the meniscus 12 in the discharge port 4 to be discharged as a droplet, but allows the meniscus to project from the discharge port surface 11, as shown in FIGS. 5(*b*) and 5(*c*).

The ink mist particle 15 on the discharge port surface 11 is thus absorbed by the ink which covers the vicinity of the left discharge port 4 and removed therefrom, as shown in FIGS. 5(*b*) and 5(*c*).

Thereafter, as shown in FIGS. 5(*d*) and 5(*e*), the left meniscus 12 which absorbs the ink mist particle 15 returns to the state (normal meniscus state) shown in FIG. 5 (d) at the equilibrium point between the capillary force, ink back pressure and atmospheric pressure.

When a recording signal of the next cycle is applied to the energy generating means (heating element) 8, therefore, the left discharge port 4 is driven at the same time as the right discharge port 4 which is continuously driven for recording, without delay, as shown in FIG. 5(*f*), so as to discharge the ink droplet at the same time as the right discharge port 4, as shown in FIG. 5(*g*).

In this way, the ink jet recording head has the discharge port 4 which does not to discharge the ink droplet even if for one cycle in the course of recording on a recording material such as paper or the like, while the other discharge ports 4 normally discharge droplets (recording). The ink jet recording head is therefore capable of removing the ink mist particle on the discharge port surface 11 by driving the discharge port 4 so that the meniscus 12 of the discharge port 4 is projected from the discharge port surface 11 and vibrated with an amplitude which allows the projecting ink to temporarily cover the vicinity of the discharge port.

The above-described embodiment having a simple structure causes no increase in the size of the recording apparatus and employs the vibrations of the menisci 12, 13 so as to remove the floating ink mist particle 15, which adheres to the vicinity of the discharge ports 4 on the discharge port surface 11 of the ink jet recording head 10, within a very short time. The ink jet recording apparatus of this embodiment can ensure that the quality of the recorded images is always good.

As seen from the above description, in the ink jet recording apparatus having a plurality of discharge ports; which are disposed on the discharge port surface of the recording head, and the energy generating means provided corresponding the respective discharge ports for the purpose of discharging ink as a droplet for recording, at least part of the energy generating means respectively corresponding the discharge ports which discharge no droplet for recording are driven so that the meniscus in each of the discharge ports outwardly projects from the discharge port surface and vibrates with an amplitude which allows the projecting ink temporarily to cover the vicinity of each of the discharge ports. The ink jet recording apparatus therefore requires no extra space and is capable of removing the floating ink mist particle which adheres to the discharge port surface within a short time and keeping the quality of the recorded images good.

In addition to the above arrangement, part of the discharge ports corresponding to the energy generating means, which are driven so that the meniscus of each of the discharge ports outwardly projects from the discharge port surface and vibrates with an amplitude which allows the projecting ink temporarily to cover the vicinity of each discharge port, are dummy discharge ports which discharge no ink droplet for recording. The ink jet recording apparatus therefore freely performs the operation of removing the floating ink mist particle adhering to the discharge port surface, which operation is independent of the recording operation.

Embodiment 2

Another embodiment of the present invention is described below with reference to the drawings.

Figure 6:
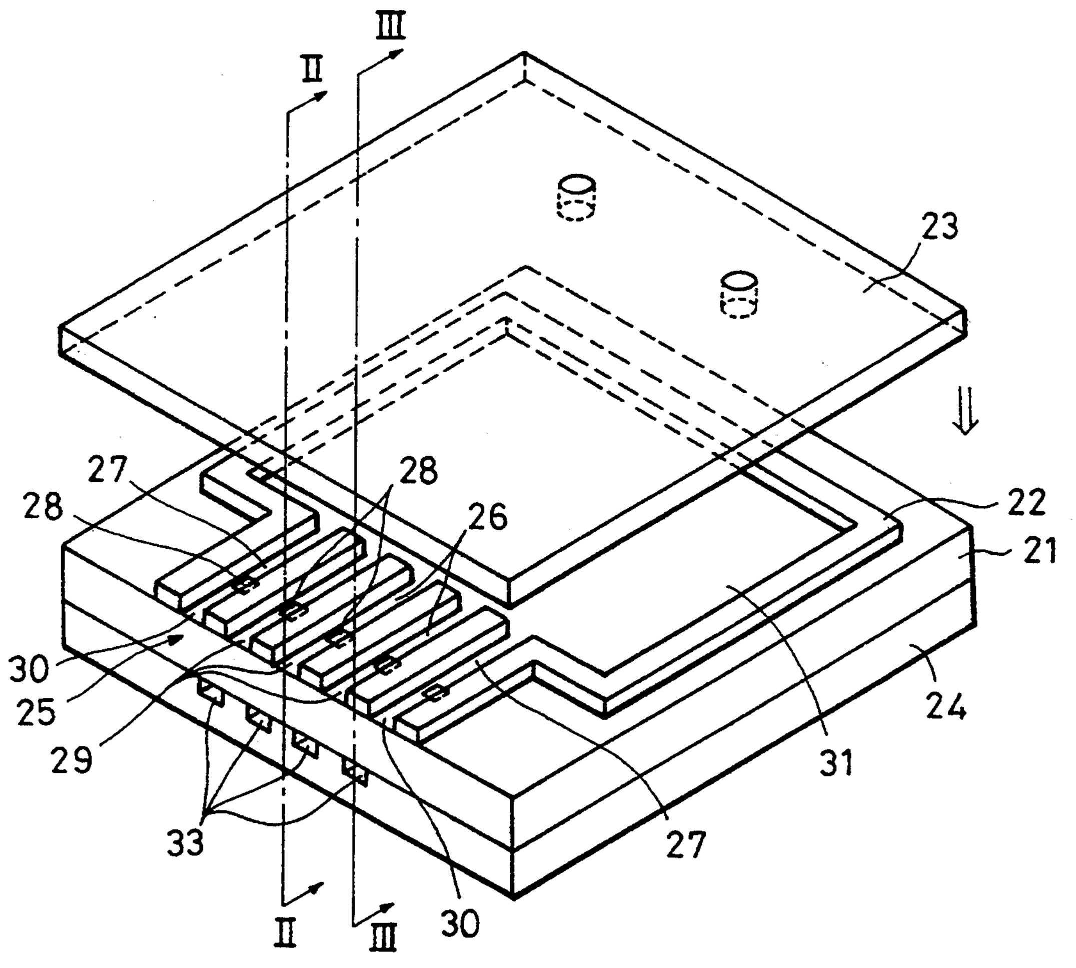
FIG. 6 is an exploded perspective view of a recording head of an ink jet recording apparatus in accordance with another embodiment of the present invention.
Figure 7:
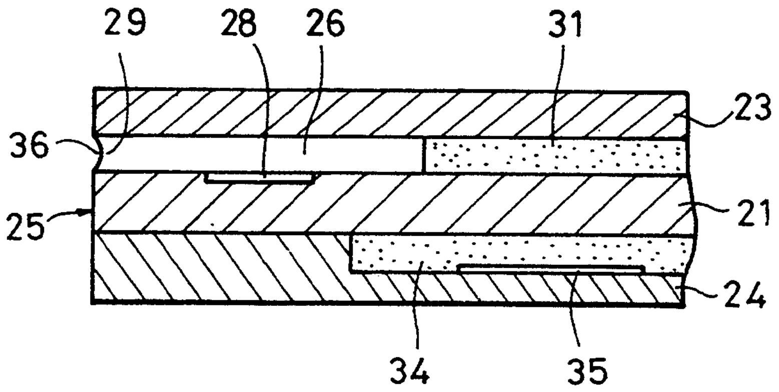
FIG. 7 is a partially sectional view taken along line II—II in FIG. 6.

FIG. 6 is an exploded perspective view of a recording head provided on an ink jet recording apparatus in accordance with another embodiment of the present invention. FIG. 7 is a sectional view taken along line II—II in FIG. 6, and FIG. 8 is a sectional view taken along line III—III in FIG. 6.

Figure 8:
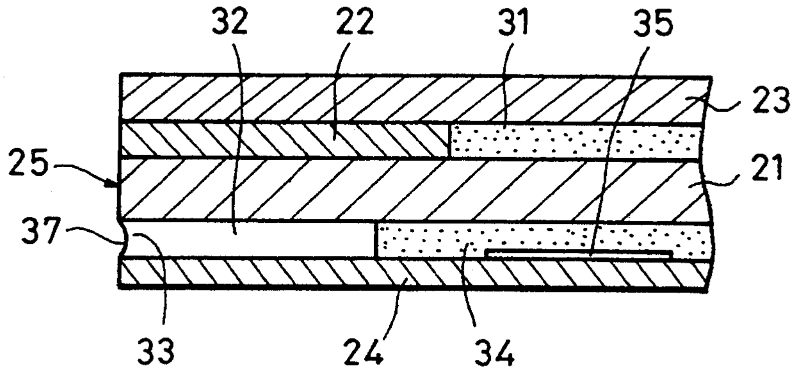
FIG. 8 is a partially sectional view taken along line III—III in FIG. 6.

In FIGS. 6 to 8, a recording head comprises a liquid passage wall 22 which is formed on the upper side of a substrate 21 by using a photosensitive resin, a discharge port surface 25 which is disposed on the front side thereof opposite to a recording medium such as paper or the like by respectively bonding a top plate member 23 and a base plate member 24 to both sides of the substrate 21, and the liquid passages and the liquid chambers, both of which are disposed in the head and are described below.

In this recording head, a plurality of recording liquid passages 26 and two dummy liquid passages 27 disposed at both sides of the recording passages 26 are formed on the upper side of the substrate 21. Each of the liquid passages 26, 27 formed on the upper side has a heating element 28 serving as energy generating means for generating energy employed for discharging a liquid as a droplet or creating a protruding meniscus without discharging a droplet.

Each of the recording liquid passages 26 communicates with a recording discharge port 29 open in the discharge port surface 25. Each of the dummy liquid passages 27 communicates with a dummy discharge port 30 open in the discharge port surface 25.

The recording discharge ports 29 discharge droplets for recording, while the dummy discharge ports 30 discharge no droplet for recording.

The liquid chamber 31 is formed on the upper side cf the substrate 21 so as to communicate with all the liquid passages 26, 27.

A plurality of dummy liquid passages 32 are formed on the lower side of the substrate 21 so as to respectively communicate with dummy discharge ports 33 open in the discharge port surface 25.

The liquid chamber 34 is formed on the lower side of the substrate 21 so as to communicate with all the dummy discharge ports 32 on the lower side.

An electrostrictive element 35 is disposed in the lower liquid chamber 34.

The dummy discharge pots 33 also discharge no droplet for recording.

The ink is supplied to each of the liquid chambers 34 from a main ink tank (not shown) through a supply tube (not shown).

Reference numeral 36 in FIG. 7 denotes the meniscus of each of the discharge ports 2 9, and reference numeral 37 in FIG. 8 denotes the meniscus of each of the dummy discharge ports 33.

In the above arrangement, although the dummy liquid passages 27 and the dummy discharge ports 30 are provided on the upper side or the substrate 21 for the sake of ease of the production of the ink jet recording head, they are provided mainly for removing air from the liquid chamber 31 on the upper side. In some cases, they thus have the same function as that disclosed in U.S. Pat. No. 4,126,868 and Japanese Patent Laid-Open No. 61-35966.

During recording, when the heating element 28 in each of the recording liquid passages 26 is driven on the basis of the recording signal, vapor bubbles are generated on the surfaces of the heating elements 28, and the recording solution is discharged as droplets from each of the recording discharge ports 29 for recording an image on the basis of the generation of bubbles.

The ink is supplied to each of the recording liquid passages 26 from the liquid chamber 31 by virtue of the capillary force when the droplets are discharged.

On the other hand, in the dummy liquid passages 32 and the dummy discharge ports 33, predetermined pressure is applied to the ink in the dummy liquid passages 32 from the electrostrictive element 35 regardless of the pressure in the recording liquid passages 2 6 during recording.

The driving pressure applied from the electrostrictive element 35 is previously set to a value which allows the meniscus 37 formed at each of the dummy discharge ports 33 to outwardly project from the discharge port and the ink in each of the dummy liquid passages 32 to vibrate so as to temporarily cover the vicinity of each of the recording discharge ports 29.

FIGS. 9(A) to 9(E) are schematic sectional views oil the discharge port portion provided for explaining the driving state of the recording head, which is described above with reference to FIGS. 6 to 8.

In FIG. 9, the meniscus 37 formed at the dummy discharge port 33 outwardly projects from the dummy discharge port 33 due to the pressure applied to the ink by driving the electrostrictive element 35 during the time from the state (shown by A) where the meniscus 36 outwardly projects from the discharge pore 29 of the recording liquid passage 26 on the basis of a recording signal and the state (shown by B) immediately before the recording solution is separated as a droplet 38.

The meniscus 37 of the dummy discharge port 33 reaches the state (shown by D in FIG. 9) where it projects to the maximum extent after the state (shown by C in FIG. 9) where the droplet 38 is discharged from the recording discharge port 29.

Figure 9A:
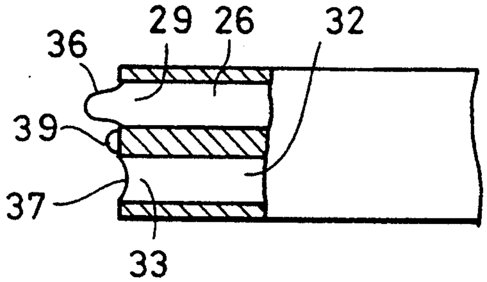
FIGS. 9(A) to 9(E) are schematic sectional views for explaining the operation of driving the recording head shown in FIG. 6.
Figure 9B:
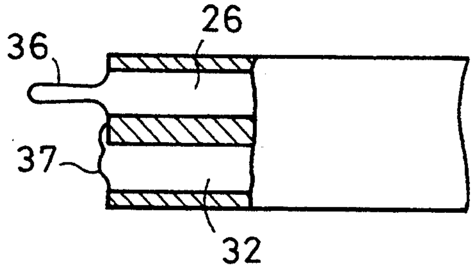
Figure 9C:
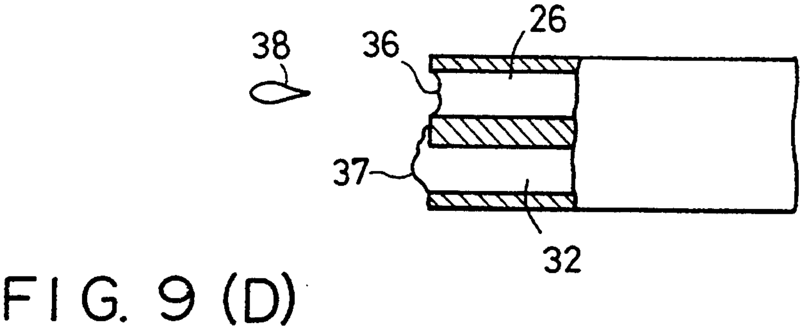
Figure 9D:
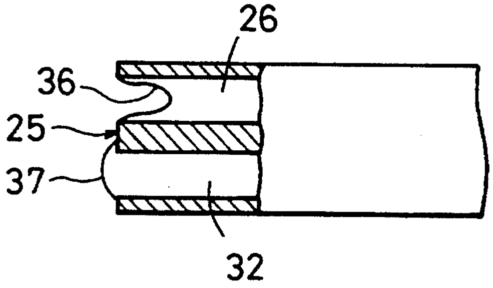
Figure 9E:
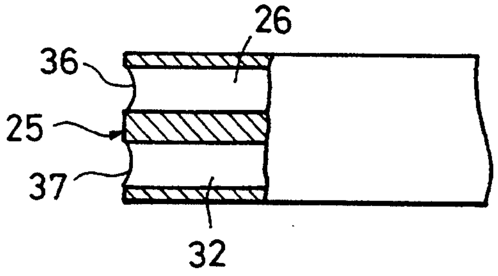

The projection of the meniscus 37 from the dummy discharge port 33 causes the ink to cover the vicinity of the recording discharge port. 29 on the discharge port surface 25 and absorb the ink mist particle 39 which adheres to the discharge port surface 25, as shown in FIGS. 9(B) to 9(D).

Thereafter, the ink projecting from the discharge port surface 25 is sucked by the dummy liquid passage 32 through the dummy discharge port 33 when the pressure in the dummy liquid passage is decreased so as to reach the state shown by (E) in FIG. 9. In the state shown by E, the meniscus 36 of the dummy discharge port 33 returns to the initial state.

In the example shown in the drawings, as shown in FIGS. 9(A) to 9(C) , the droplet 38 for recording is separated and discharged immediately after the meniscus 37 of the dummy discharge port 33 absorbs the ink mist particle 39 on the discharge port surface 25.

The driving frequency of the electrostrictive element 15 provided in the liquid chamber 34 is set to a value which does not affect the preferable discharge state of the droplet 38 in accordance with the driving conditions for recording of the ink jet recording head. The operation steps, which are described above with reference to FIG. 9, are repeated so that the ink mist particle 39 adhering to the discharge port surface 25 of the ink jet recording head can be removed.

Figure 10:
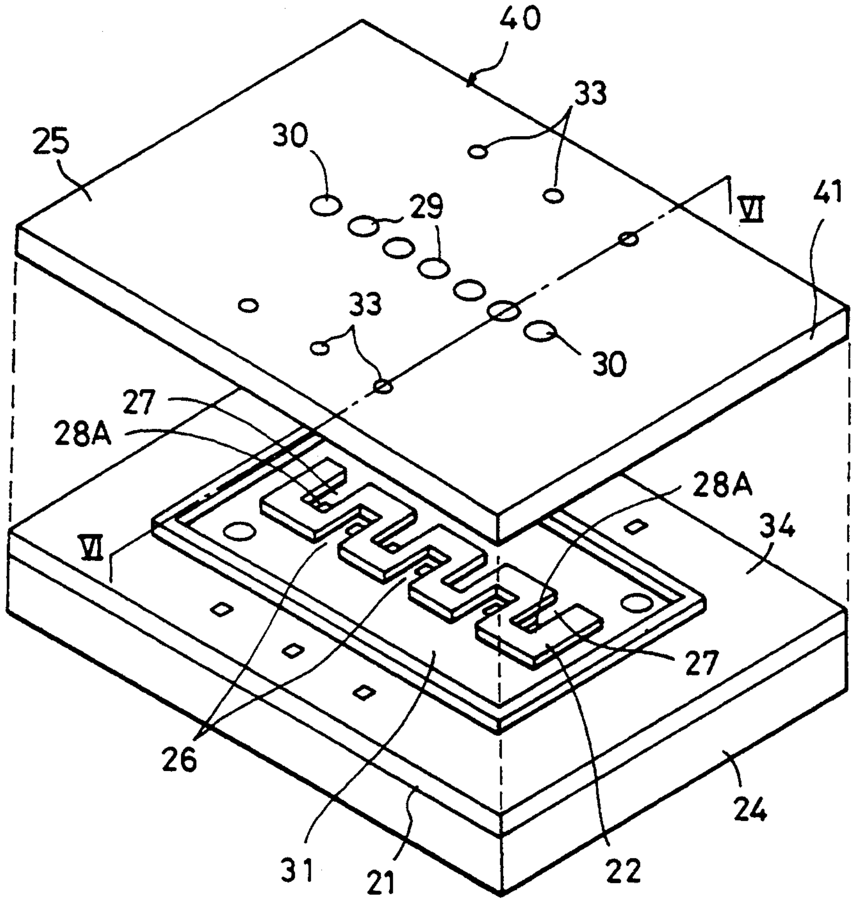
FIG. 10 is an exploded perspective view of a recording head of an ink jet recording apparatus in accordance with a further embodiment of the present invent ion.
Figure 11:
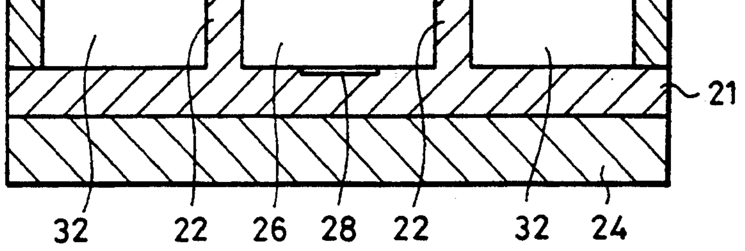
FIG. 11 is a sectional view taken along line VI—VI in FIG. 10.
Figure 12:
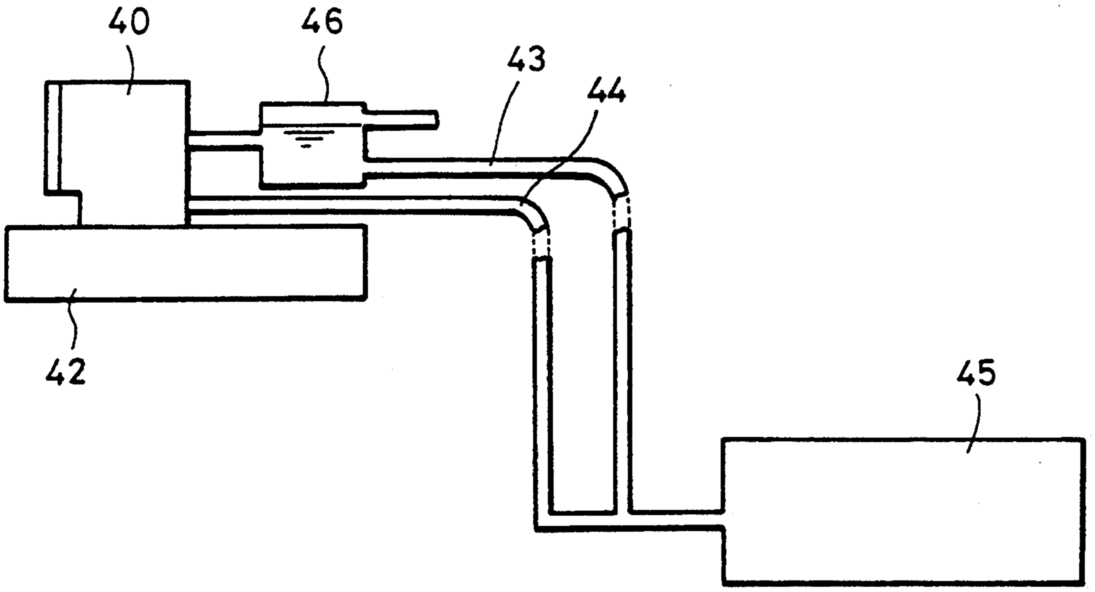
FIG. 12 is a schematic drawing of the arrangement of an ink supply system for supplying ink to a the recording head shown in FIG. 10.
Figure 13:
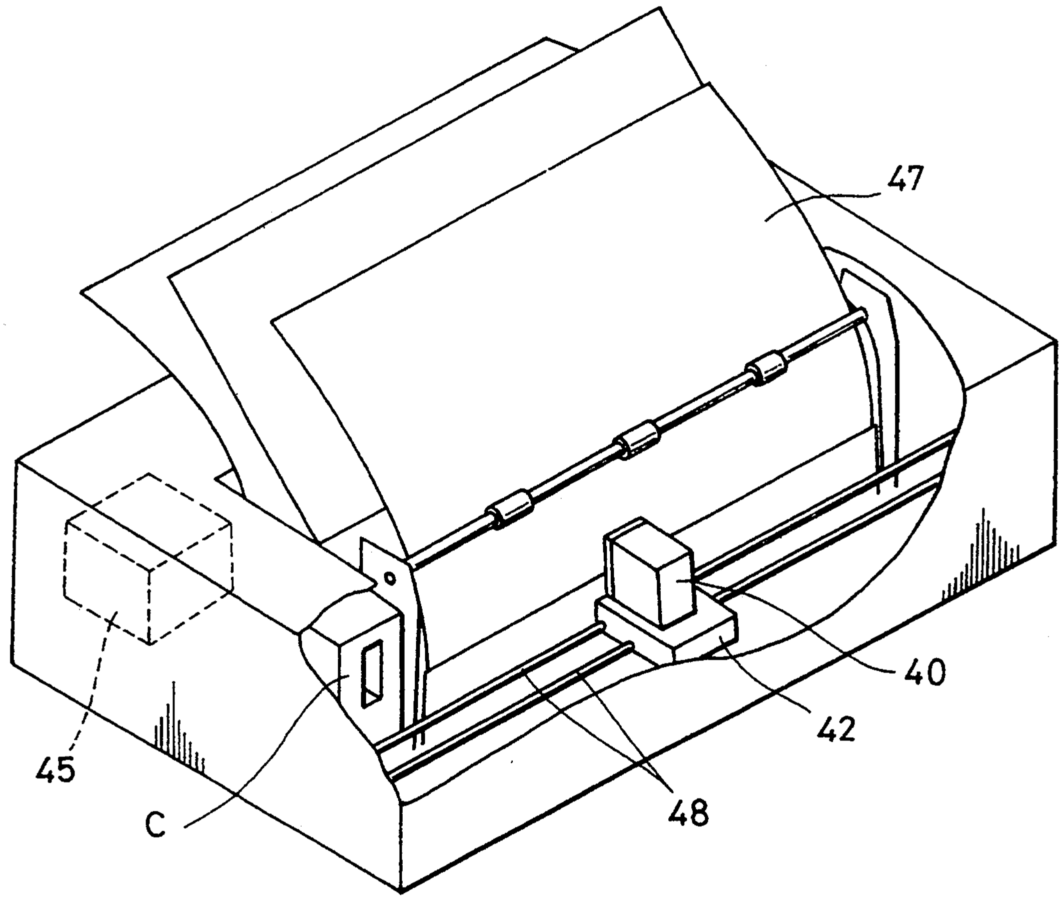
FIG. 13 is a schematic perspective view of an ink jet recording apparatus provided with a carriage on which the recording head shown in FIG. 10 is loaded.

FIG. 10 is an exploded perspective view showing a recording head 40 provided in an ink jet recording apparatus in accordance with a further embodiment of the present invention. FIG. 11 is a sectional view taken along line VI—VI in FIG. 10, FIG. 12 is a schematic drawing of the structure of the ink supply system of the recording head 40 shown in FIG. 10, and FIG. 13 is a schematic perspective view of an ink jet recording apparatus provided with the recording head shown in FIG. 10.

In the embodiment shown in FIGS. 10 to 13, portions corresponding to those in the embodiment shown in FIGS. 6 to 9 are denoted by the same reference numerals.

In FIGS. 10 and 11, a liquid passage wall 22 is formed on a substrate 21 bonded to a base plate 24 by using a photosensitive resin. In a discharge port plate 41 to be united to the substrate 21 are formed a plurality of recording discharge ports 29 at the central portion thereof, two dummy discharge ports 30 at both ends of the row of the recording discharge ports 29 and two rows of dummy discharge ports 33 at both sides of the recording discharge ports 29.

A discharge port surface 25 is formed on the upper side of the discharge port plate 41.

The recording discharge ports 29 respectively communicate with the corresponding recording liquid passages 26. A heating element 28 serving as energy generating means for recording is provided in each of the recording liquid passages 26.

The dummy discharge pores 30 at both ends of the recording discharge ports 29 respectively communicate with the dummy liquid passages 26 at both ends, a heating element 28A being provided in each of the dummy liquid passages 27.

The dummy discharge ports 33 formed in two rows at both sides of the recording discharge ports 29 respectively communicate with the dummy liquid passages 32.

The liquid passages 26, the dummy liquid passages 27 and the dummy liquid passages 32 are separated from each other by the liquid passage wall 22.

Although the recording discharge ports 29 discharge droplets for recording, the dummy discharge ports 30 and the dummy discharge ports 33 discharge no droplet for recording.

In the recording head 40 are formed liquid chambers 31, 34 which are separated from each other. All the recording discharge ports 29 and all the dummy discharge ports 30 communicate with the liquid chamber 31, while all the dummy discharge ports 33 formed in two rows at both sides of the discharge ports 29 communicate with the liquid chamber 34.

In the above arrangement, one of the reasons for providing the dummy discharge ports 30 at both ends of the recording discharge ports 29 is to facilitate the production of the ink jet recording head. However, since the dummy discharge ports 30 are mainly provided for removing air from the liquid chamber 31 communicating with each of the recording discharge ports 29 in some cases, the dummy discharge ports 30 have the same function as that disclosed in U.S. Pat. No. 4,126,868 and Japanese Patent Laid-Open No. 61-35966.

In FIG. 11, reference numeral 36 denotes a meniscus of each of the recording discharge ports 29, and reference numeral 37 denotes a meniscus of each of the dummy discharge ports 33.

In FIG. 12, the recording head 40 is loaded on a carriage 42 which performs reciprocating motion along a recording medium such as paper or the like (shown in FIG. 13).

FIG. 13 is a schematic perspective view of the whole of an ink jet recording apparatus provided with the recording head 40 shown in FIG. 12. In the drawing, the carriage 42 performs reciprocating motion along a guide shaft 48 which is disposed in front of a recording medium 47 so as to extend in the lateral direction.

A main ink tank 45 is provided in the body of the ink jet recording apparatus for the purpose of supplying ink to the recording head 40 loaded on the carriage 42. In FIG. 3, character C denotes a cap for covering the discharge ports provided on the head 40.

In FIG. 12, the liquid chambers 31 and 34 are connected to the main ink tank 45 in the apparatus body through ink supply tubes 43 and 44, respectively, made of a ethylene-vinyl acetate resin.

In the ink jet recording apparatus shown in FIG. 12, because the ink supply tubes 43, 44 are bent when the carriage 42 moves during recording, the pressure of the ink supplied through the tubes 43, 44 is significantly changed in some cases.

However, since a sub-tank 46 having an air butler effect is disposed at an intermediate position of one of the ink supply tubes 43, the variation in the ink pressure, which caused by bending of the tube 43, is absorbed by the sub tank 46.

The recording discharge ports 29 which communicate with one of the liquid chambers 31 in the recording head 40 are thus capable of stably discharging droplets.

Because the other liquid chamber 34 is directly affected by a variation in the ink pressure caused by bending of the ink supply tube 44, the meniscus 37 at each of the dummy discharge ports 33 is vibrated.

When the volume of the liquid chamber 34 and the shape of each of the dummy discharge ports 33 are appropriately determined corresponding to the level of variation in the ink pressure, the meniscus 37 at each of the dummy discharge ports 33 can be set so as to vibrate as described below.

The meniscus 37 can be set so as to be outwardly projected from each of the dummy discharge ports 33 by the vibration with an amplitude which allows the projected ink cover the vicinity of each of the recording discharge ports 29.

The vibration of the meniscus 37 set as described above permits the ink mist particle 39 (FIG. 9) which adheres to the circumference of each of the recording discharge ports 29 on the discharge pore surface 25 (upper side) of the discharge port plate 41 to coalesce with the projecting ink and be removed my substantially the same operation as that of removing the ink mist particle, which is described above with reference to FIG. 9.

Namely, during recording, vapor bubbles are generated on the surface of each of the heating elements 28 in the recording liquid passages 26 by driving the heating elements 28, and droplets are discharged from the recording discharge ports 29 for recording an image on the basis of the generation of bubbles.

When the droplets are discharged, the ink is supplied to each of the recording liquid passages 26 from the liquid chamber 31 by virtue of the capillary force.

On the other hand, during recording, predetermined pressure is applied to the ink in the dummy liquid passages 32 owing to a variation in the pressure in the liquid chamber 34, which is caused by movement of the carriage 42, in a manner independent of the pressure state in the recording liquid passages 26.

The driving pressure of the dummy liquid passages 32, which is produced by movement of the carriage 42, is previously determined so as to outwardly project the meniscus 37 formed at each of the dummy discharge ports 33 and vibrate the ink in each of the dummy liquid passages 32 so that the projecting ink temporarily covers the circumference of each of the recording discharge ports 29.

The plurality of recording discharge pores 29 are selectively driven by a recording signal to discharge ink droplets (droplets) for recording. The dummy discharge ports 33 discharge no ink droplet for recording but function to remove the ink mist particle which adheres to the discharge port surface 31 by employing the meniscus outwardly projecting therefrom.

As seen from the above description, in the ink jet recording apparatus having the dummy discharge ports each of which has a size allowing a meniscus to be held therein, discharges no droplet and is disposed at a portion on the ink jet recording head, which is near the recording discharge ports for discharging droplets to the recording material, at least part of the dummy discharge ports are caused to communicate with the liquid chamber which is different from the liquid chamber communicating with each of the recording discharge ports. The meniscus formed in each of the dummy discharge ports is thus vibrated independently of the discharge of droplets from the recording discharge ports so that the ink mist particle adhering to the vicinity of each of the recording discharge ports on the discharge port surface can be easily removed. The ink jet recording apparatus is therefore capable of stably recording high quality images.

In addition to the above arrangement, the pressure of the ink in at least one of the liquid passages respectively communicating with the dummy discharge ports, the liquid chamber communicates with the liquid passages of the dummy discharge ports only and the supply passage for supplying the ink to this liquid chamber is changed so as to apply pressure to the ink in the liquid passage of each dummy discharge port. This causes the meniscus formed in each of the dummy discharge ports to outwardly project therefrom and the ink to vibrate with an amplitude which allows the ink to temporarily cover the vicinity of each of the recording discharge ports on the discharge port surface. Thus the ink jet recording apparatus is not increased in size and is capable of removing the floating ink mist particle which adheres to the discharge port surface within a short time and is capable of constantly keeping the quality of the recorded images good.

Embodiment 3

Figure 14:
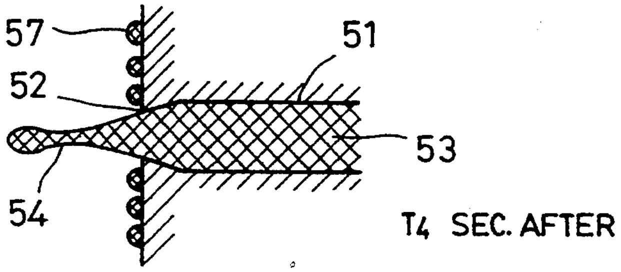
FIG. 14(*a*) to 14(*d*) are a sectional view of the vicinity of an orifice showing changes with the passage of time for explaining the dummy wiping effect of the present invention.
Figure 14:
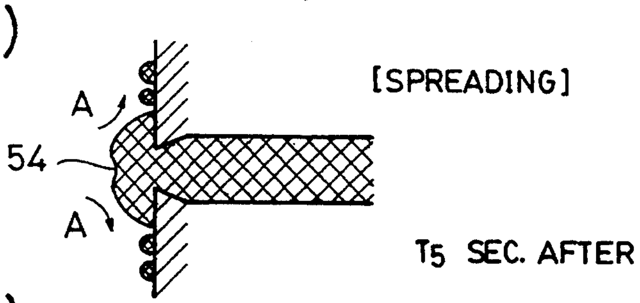
Figure 14:
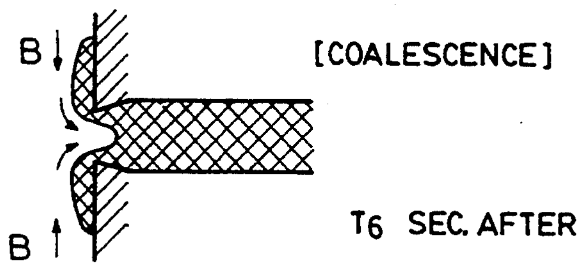
Figure 14:
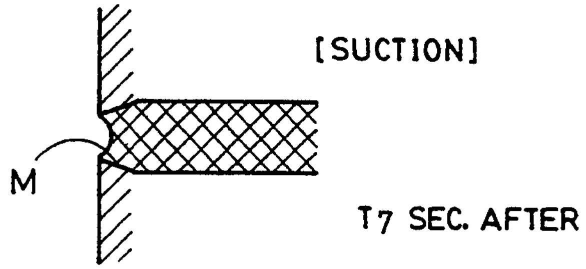
Figure 15:
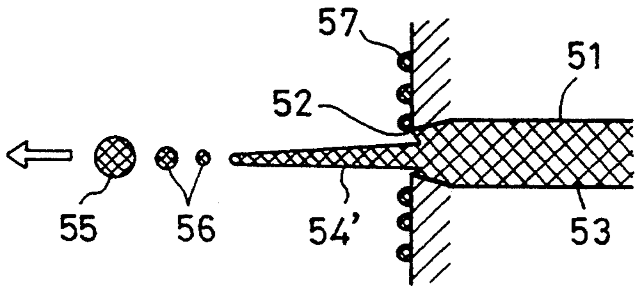
FIG. 15(*a*) to 15(*d*) are a sectional view showing changes of a normal state of ink discharged with the passage of time.
Figure 15:
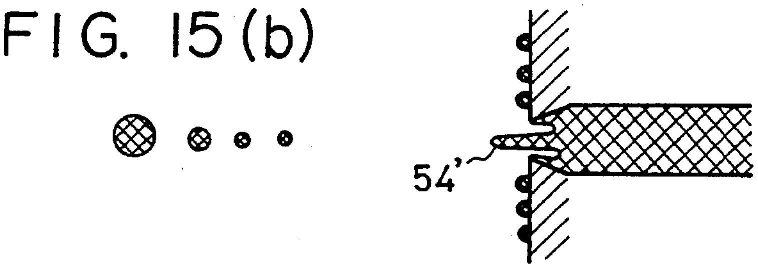
Figure 15:
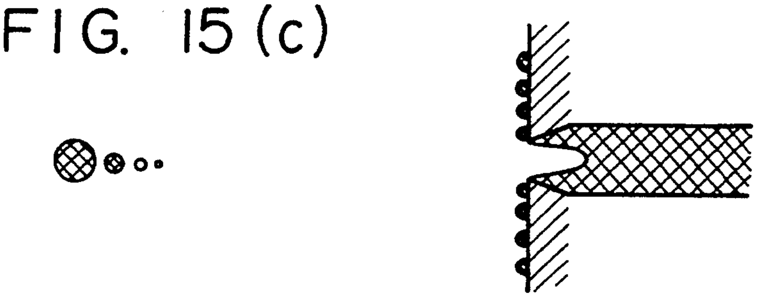
Figure 15:
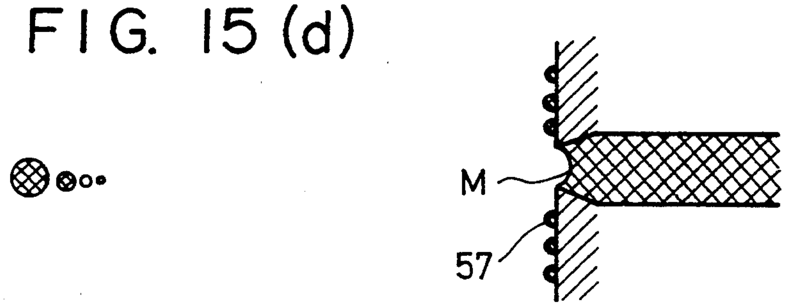
Figure 16A:
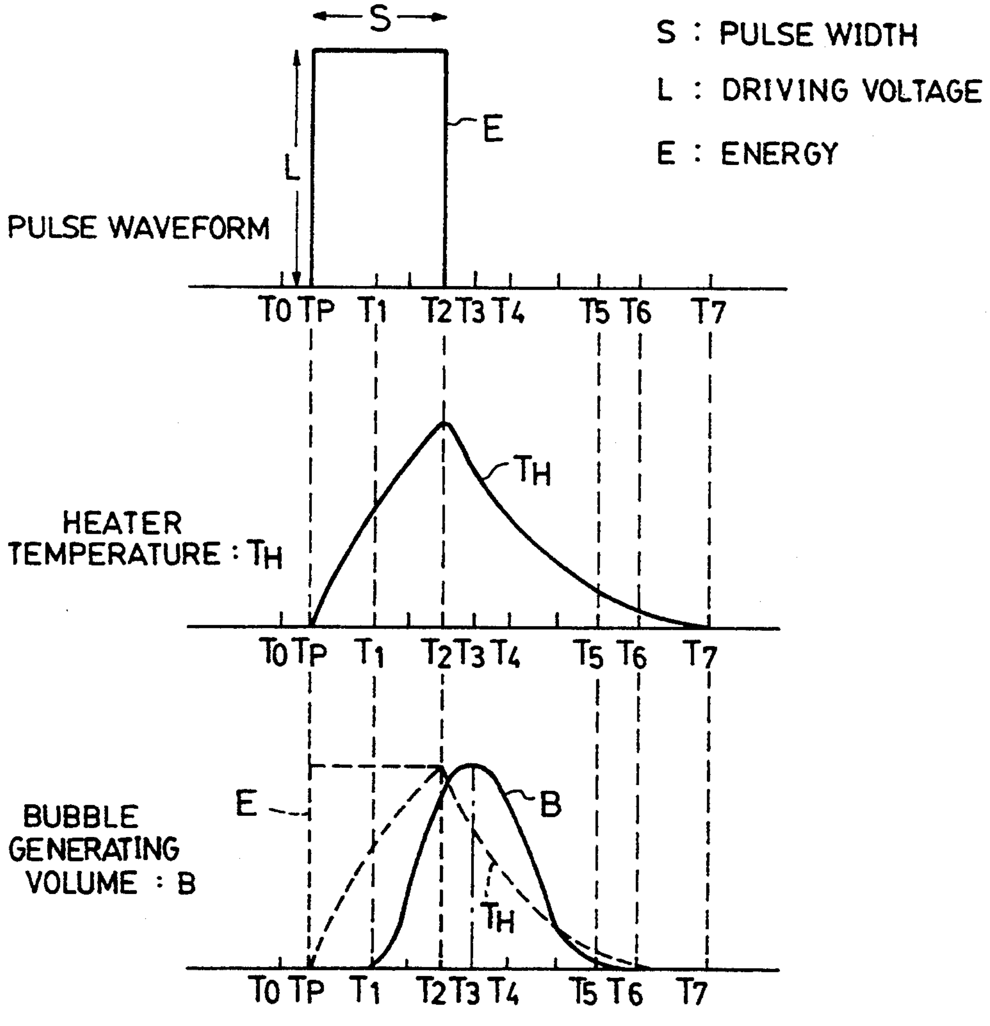
FIGS. 16A and 16B(*a*) to 16B(*g*) are respectively a graph and a sectional view showing changes in general states of the ink discharged with the passage of time.
Figure 16B:
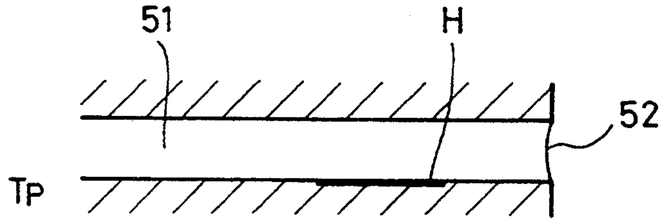
Figure 16B:
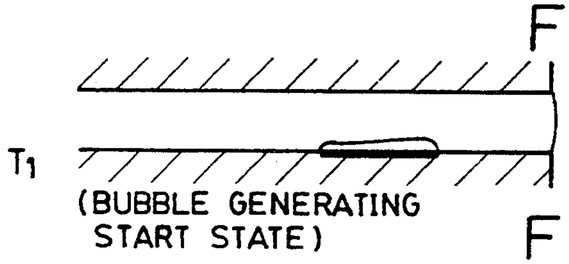
Figure 16B:
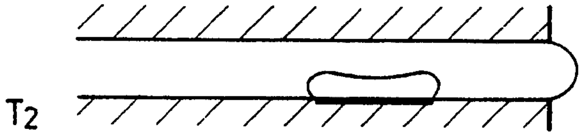
Figure 16B:
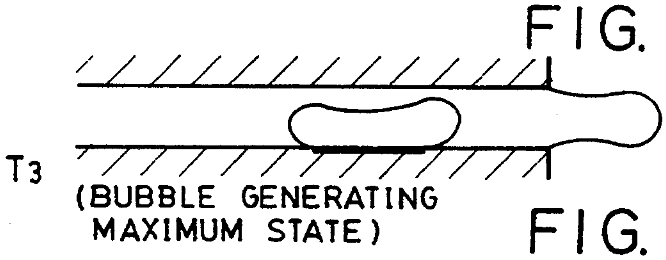
Figure 16B:
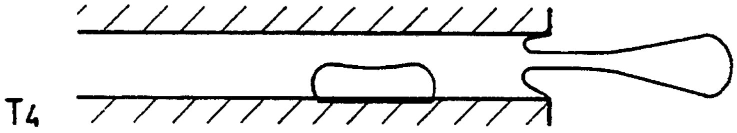
Figure 16B:
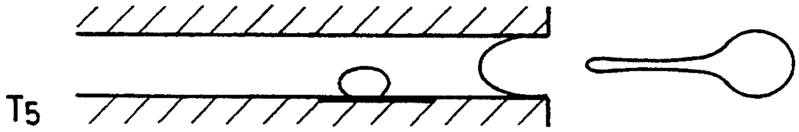
Figure 16B:
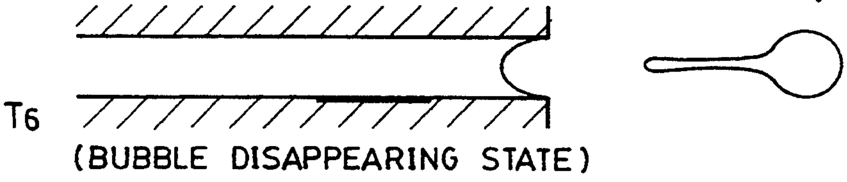

FIGS. 14(*a*), 14(*b*), 14(*c*) and 14(d) are sectional views showing changes with passage of time of the wiping effect which is the fundamental characteristic of this embodiment. FIGS. 15(*a*), 15(*b*), 15(*c*) and 15(*d*) are sectional view showing changes with time of the normal state of ink to be discharged. In FIGS. 14 and 15, reference numeral 51 denotes an ink passage communicating with an orifice; reference numeral 52, an orifice; reference numeral 53, ink; reference numeral 54, columnar ink; and character M, a meniscus. Reference numeral 57 denotes wet ink droplets formed when the ink 53 is discharged during printing or the like. The state shown in FIG. 14(*a*) is a state where bubbles slightly disappear after bubbles are generated in the ink by the heat generated from a heater (not shown in the drawing and corresponding to character H in FIG. 16B) and reach the maximum generation state. As seen from the graph shown in FIG. 16A, which shows changes with time of the state of the ink discharged by an ink jet method employing thermal energy, FIG. 14 (*a*) shows the state $T_4$ second after the time a signal is sent to the heater. FIGS. 16A and 16B(*a*) to 16B(*g*) are a graph and a sectional view, respectively, which show changes with time of a general state of the ink discharged.

In this state, energy PT applied to the heater is about 64% of the energy $P_o$ required for normally discharging the ink as shown in FIG. 15(*a*), and the ink 53 forms the columnar ink 54. However, conversely to the state shown in FIG. 15(*a*) , a main droplet 55, a satellite droplet 56 and the ink 53 are not separated from each other, while maintaining the state immediately before the discharge.

FIGS. 14(*b*) and 15(*b*) show a later state, time $T_5$, in which the columnar ink 54 is returned to the ink passage 51 because the inside of the ink passage 51 is refilled with the ink 53 owing to the rapid disappearance of bubbles in the passage. At this time, as shown in FIG. 15(*b*), since a columnar ink 54 produced after the main droplet 55 and the satellite 56 are separated therefrom by normal discharge has a small volume, the ink is smoothly sucked into the ink passage 51. However, in the state shown in FIG. 14(*b*), since the columnar ink 54 has; a large volume because the ink 53 is not separated, the columnar ink 54 is not smoothly sucked into the ink passage 51, forms a mass having a size greater than the orifice 52, spreads around the orifice 52 as shown by arrow A and starts to coalesce with the wet ink droplets 57.

FIGS. 14(*c*) and 15(*c*) show states time $T_6$ after the discharge. In FIG. 14(*c*), after the ink 53 refilled in the ink passage 51 spreads to the maximum extent and completely coalesces into the wet ink droplets 57 around the orifice 52, the ink 53 contacts and is sucked in the orifice 52 by the surface energy of the ink 53 and the refilling force of the ink passage 51, as shown by arrow B. In FIG. 15 (*c*), since the ink does not spread and cannot coalesce with the wet ink droplets 57, the wet ink droplets remain on the discharge port surface.

FIGS. 14(*d*) and 15 (*d*) shows states $T_7$ after the discharge in which the bubbles generated completely disappears, and the ink in the ink passage 51 including the meniscus assumes a stable state. In FIG. 14(*d*), the wet droplets 57 around the orifice 52 are completely removed, while, in FIG. 15(*d*), the wet ink droplets 57 remain on the discharge port surface. Namely, the present invention has the wiping effect of removing wet ink droplets by producing the dummy discharge state, without using any sliding member such as a blade or the like. The wiping effect of the present invention is described below with reference to FIG. 17 which is a front view of the discharge ports.

Figure 17A:
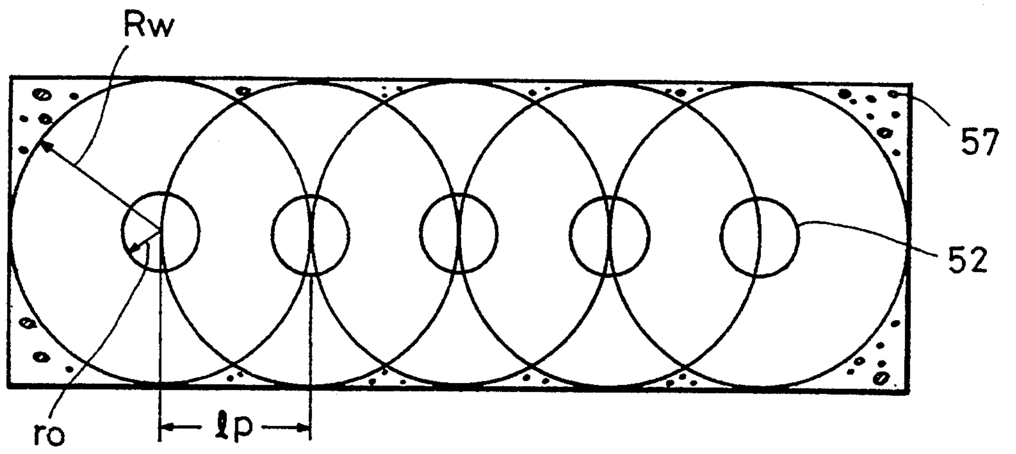
FIG. 17(*a*) to 17(*c*) are a front view showing various states of an orifice surface.
Figure 17B:
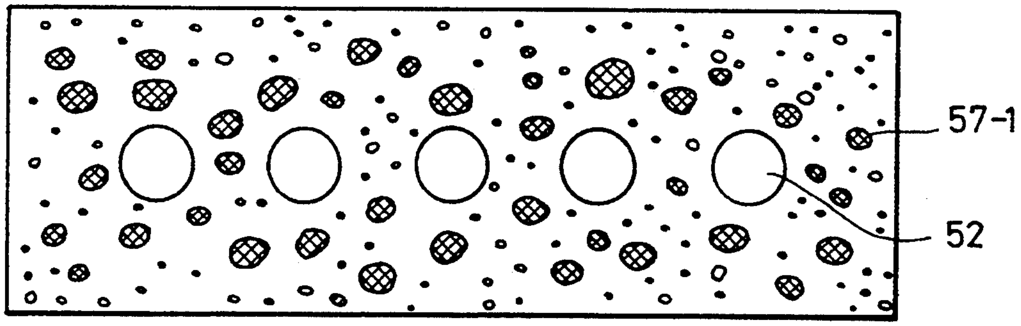
Figure 17:
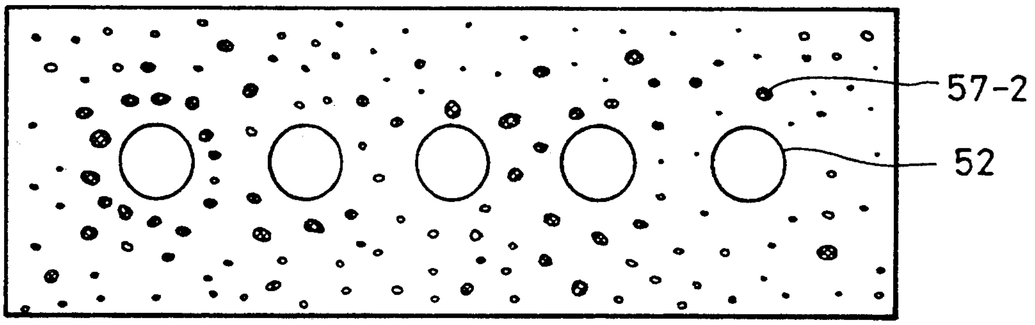
Figure 17:
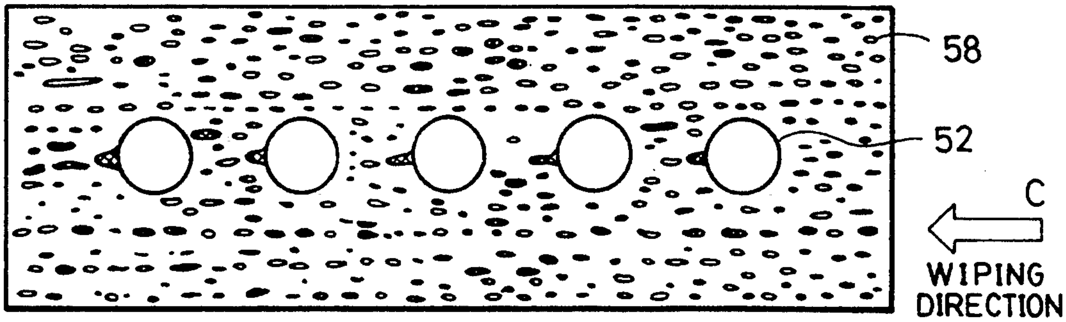

FIG. 17(*a*) shows a state after the dummy wiping is performed in accordance with the present invention. In the drawing, $r_o$ denotes a nozzle radius; $l_p$, a nozzle pitch; and $R_W$, the radius of the dummy wiping area.

FIGS. 17(*b*) and 17(*c*) shows wetting states after printing in cases of high duty and low duty, respectively. The wetting amount generally tends to increase as the printing time or printing duty increases. If the wetting amount is large, wet ink droplets combine or coalesce each other to easily form large wet ink droplets 57-1. If the wetting amount is small, small wet ink droplets 57-2 are formed. The size of the large wet ink droplets 57-1 is about ½ to several times the orifice diameter $2r_o$, and the size of the small wet ink droplets 57-1 is about 1/10 of the orifice diameter $2r_O$.

FIG. 17(*d*) shows an example of a state after wiping in the direction of arrow C by using a silicone rubber blade. As shown in the drawing, although no wet ink droplet remains, many small ink droplets 58 which escape from the blade, sometimes remain on the port surface.

Figure 18:
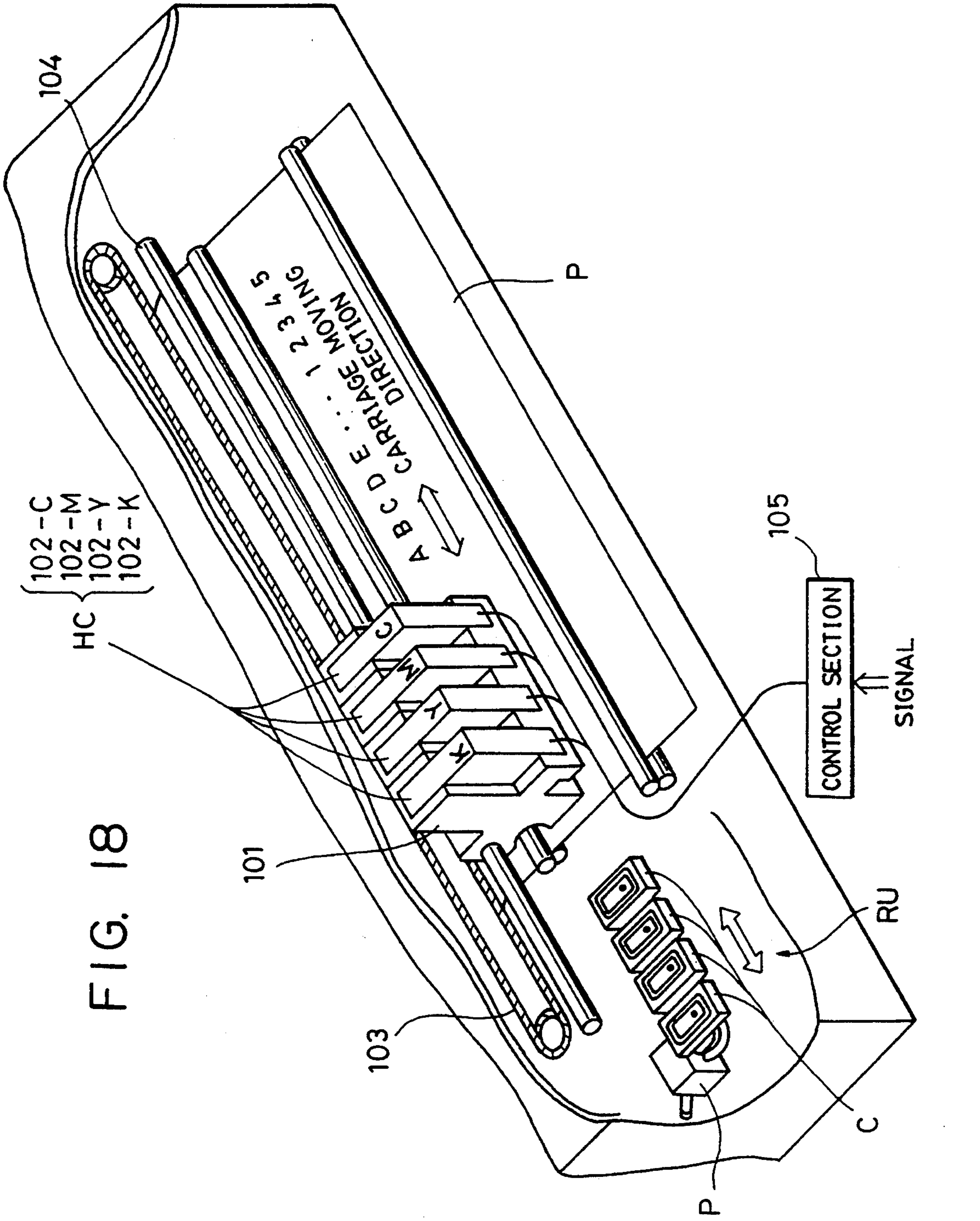
FIG. 18 is a perspective view showing a principal portion of a liquid jet recording apparatus to which the present invention is applied.

FIG. 18 is a schematic perspective view of a principal portion of a liquid jet recording apparatus to which the present invention is applied.

This apparatus is a serial color printer equipped with a cartridge type ink jet head HC which uses an ink jet method employing thermal energy and which has 128 nozzles of 400 dpi (dots per inch). This apparatus is capable of color printing by using colors C, M, Y, K. Each of cartridge type ink jet heads 102-C, M, Y, K for the colors C, M, Y, K is detachably provided on a carriage 101. The driving frequency f of each cf the heads during normal ink discharge is 4 KHz. The heads are driven by a stepping motor through a driving belt 103 so as to laterally move along a rod 104 for supporting the carriage 101 for printing on a recording material P such as paper of the like (details of the movement of the printer are not described below).

In order to prevent a reduction in throughput and mixing of the colors of the heads, both of which are caused by wiping during printing, this apparatus employs a method in which dummy wiping is performed by changing the width of the pulse applied to the heaters for the ink jet heads. The conditions for the dummy wiping are as follows:

Normal Discharge
Driving voltage—$V_{op}$=20.0 (V)
Driving pulse width—Tpw=5.0 (μsec)
Driving frequency—f=4 (KHz)
Dummy Wiping
Driving voltage—$V_{OP}$=20.0 (V)
Driving pulse width—Tpw=3.2 (μsec)
Driving frequency—f=about 1 (KHz)

This apparatus comprises a sequence for preventing the occurrence of stain on the heaters. In the sequence, the dummy wiping is performed at a home position under the above conditions after printing each 8 lines (on the cap C communicating with a suction recovery pump P) where a recovery system unit RU is placed in the course of the printing action. Immediately after the dummy wiping, air discharge is performed about 100 times so as to discharge the ink sucked in the ink passage. As a result, it is possible to prevent the occurrence of non-discharge of the ink or deviation in the discharge direction, which are caused by wet ink droplens during printing. It is also possible to prevent the occurrence of a reduction in the throughput of printing or mixing of the colors of the heads, which are caused by wiping with a blade. In FIG. 18, a control section for controlling the recording on the basis of an external signal and controlling the dummy wiping is shown as a block denoted by reference numeral 105.

In the present invention, although the dummy wiping is performed by changing the pulse width, substantially the same effect as that described above could be obtained by changing the driving voltage. The control can be performed by not only single pulse driving but also double pulse driving.

Figure 19:
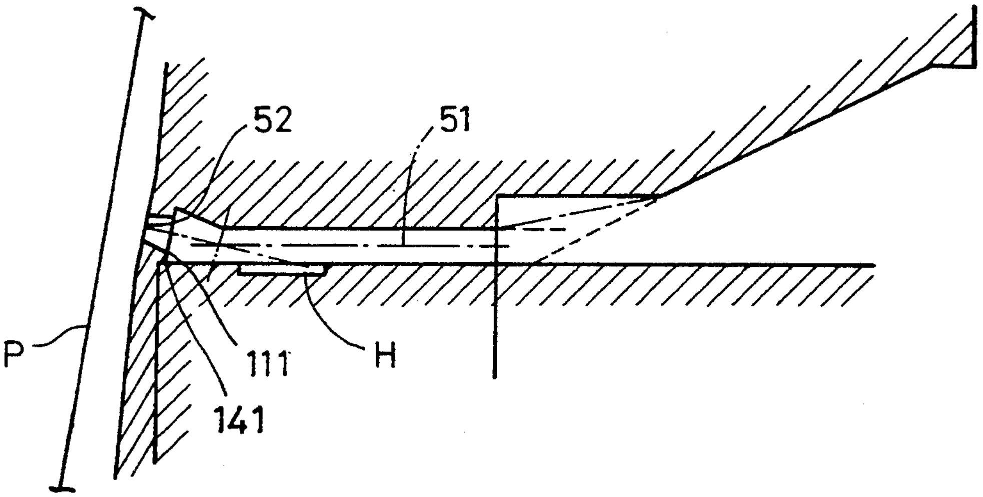
FIG. 19 is a sectional view showing a principal portion of an ink jet head in accordance with still a further embodiment of the present invention.
Figure 20:
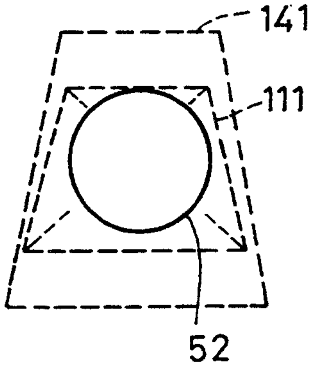
FIG. 20(*a*) and 20(*b*) are a front view showing various states of an orifice in accordance with a further embodiment of the present invention.
Figure 20:
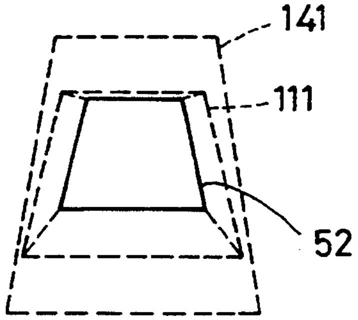

FIG. 19 shows another example of the principal portion of the ink jet head comprising an ink passage having a different shape. As shown in FIG. 19, even if an ink passage 51 has a complicated structure with irregularity, the present invention can be applied in the same way as in the above embodiments. As shown in FIG. 20, the present invention can be applied to a case where the orifice 52 has a circular form (refer to FIG. 20(*a*)) or a case where the orifice 52 has an asymmetric form with respect to the center of the orifice (refer to FIG. 20(*b*)). In FIGS. 19 and 20, reference numerals 111 and 141 respectively denote predetermined positions of the ink passage 51.

In the above embodiments, the dummy wiping effect is obtained by employing the refilling of columnar ink for sucking the wet ink droplets into the discharge ports. However, if the energy generated from the energy generating means is slightly increased so as to further grow the columnar ink and bring it into the initial discharge state (unstable discharge state), a phenomenon occurs in which the columnar ink does not enter the orifice and remains spread around the orifice. In this case, the wet ink droplets and the spread ink combine with each other and have the tendency to gather outside a certain region (a region with a radius of about $R_W$ around the center of the orifice) around the nozzle. As a result, the wet ink droplets are pushed out to a region having no influence on the normal discharge of ink so that the dummy wiping effect can be obtained during printing.

In the present invention, substantially the same effect as that described above could also be obtained by increasing the driving frequency f of the head.

When the width of the driving pulse applied to the energy generating means is controlled for removing the ink droplets adhering to the discharge port surface, it is preferable to set the driving pulse width to a value within the range of 40% to 80% of the width of the driving pulse applied to the energy generating means for discharging ink as a droplet. When the voltage of the driving pulse applied to the energy generating means for removing the adhering ink droplets is cone rolled, it is preferable to set the voltage to a value within the range of 50% to 90% of the voltage of the driving pulse applied to the energy generating means for discharging in as a droplet. When the frequency of the driving pulse applied to the energy generating means for removing the adhering ink droplets is controlled, it is preferable to set the frequency to a value within the range of 110% to 190% of the frequency of the driving pulse applied to the energy generating means for discharging ink as a droplet.

The position where the dummy wiping is performed is not limited to the home position, and for example, the dummy wiping may be performed in a region corresponding to the recording region of a recording material.

The dummy wiping is preferably performed each time the recording operation using the ink jet head is completed for a predetermined amount, for example, a predetermined number of lines or a predetermined number of sheets of paper.

In the present invention, the energy generator for discharging ink as a droplet and the energy generator for removing the adhering ink droplets are not limited to the combination of the elements in each of the above-described embodiments. Appropriate combination of an electrothermal converter, a piezoelement and the like can be used as each energy generator.

As described above, in a liquid jet recording apparatus, a state immediately before the discharge of ink is formed by controlling the energy utilized for normally discharging a liquid to form columnar ink so as to obtain the effect of rapidly wiping off the wet ink droplets around the discharge port by the operation of the ink jet head itself without requiring any other component. Even if the dummy wiping is performed in the course of the printing operation, therefore, the throughput of printing is not reduced. In addition, even if wiping is simultaneously performed for a plurality of heads having different colors, the colors are not mixed with each other. Further, because the present invention employs the non-contact wiping method, the invention does not cause unstable discharge conditions such as ink staining cutting of the head or the like, which are produced by use for an extended period of time. The present invention thus has the effect of obtaining stable image quality.

The present invention also has the effect of reducing the cost of the apparatus because no cleaning member such as a blade or the like is used.

Particularly, the present invention exhibits the excellent effect when being applied to a recording head or recording apparatus using an ink jet method, which employs thermal energy, among ink jet recording methods.

Typical arrangements and principles of such an ink jet recording method employing thermal energy are based on the basic principles disclosed in, for example, U.S. Pat. Nos. 4,723,129 and 4,740,796. Although such a method can be applied to either a so-called on-demand type or continuous type, the method is particularly effective for an on-demand type. The reason for this is that, in a case of an on-demand type, thermal energy is generated in each of the electrothermal converters, which are respectively disposed corresponding to a sheet holding a liquid (ink) and a liquid passage, by applying at least one driving signal to the converters in correspondence with record information for the purpose of applying a rapid temperature rise beyond the maximum temperature for nucleate boiling so that film boiling of the ink is produced on the thermal action surface of the recording head, resulting in the formation of a bubble in the liquid (ink) in one-to-one correspondence with the driving signal. The growing and contraction of the bubble formed causes the discharge of the liquid (ink) through the discharge orifice to form at least one droplet. If the driving signal has a pulsative form, since the bubble can be immediately appropriately grown and contracted, the discharge of the liquid (ink) can be achieved with excellent response. The pulsative driving signal is thus more preferable. Preferable examples of such pulsative driving signals are described in U.S. Pat. Nos. 4,463,359 and 4,345,262. The employment of the conditions disclosed in U.S. Pat. No. 4,313,124, which discloses an invention concerning a temperature rise rate of the thermal action surface, permits the achievement of more excellent recording.

The present invention includes the structure of the recording head in which the discharge port, the liquid passage and the electrothermal converter are combined, as disclosed in each of the above specifications, as well as the structure disclosed in U.S. Pat. Nos. 4,558,333 and 4,459,600 in which a thermal action portion is disposed in a curved region. In addition, the present invention is effective for structures based on the structures disclosed in Japanese Patent Laid-Open No. 59-123670 in which a common slit is provided as a discharge portion for a plurality cf electrothermal converters and Japanese Patent Laid-Open No. 59-138461 in which an opening for absorbing the pressure wave of thermal energy is provided corresponding to a discharge portion.

In a case of a full-line type recording head having a length corresponding to the maximum width of recording media which can be used in the recording apparatus, the present invention can be applied to either the structure disclosed in each of the above specifications in which the length is provided by combination of a Plurality of recording heads or a structure comprising a single recording head which is formed as one unit. In this case, the present invention can more effectively exhibit the above-described effects.

In addition, the present invention is effective for a case which uses a chip type interchangeable recording head which can be electrically connected to the apparatus body and to which ink can be supplied from the apparatus body when being installed therein, or a cartridge type recording head which has a cartridge provided integrally therewith.

It is preferable to add a recovery means and a preliminary auxiliary means to the recording head, which is provided as a component of the recording apparatus of the present invention, because the effects of the present invention can be further stabilized. Typical examples of such means which are effective to stable recording include capping means, cleaning means, pressure or suction means, preliminary heating means comprising an electrothermal converter, another heating element or combination thereof, a preliminary discharge mode for discharging separately from recording, all of which are provided on the recording head.

The present invention is also extremely effective for not only a recording apparatus in a recording mode having a main color such as black or the like but also a recording apparatus which comprises a recording head as one unit or combination of a plurality of recording heads in a recording mode having a plurality of different colors or a full color comprising color mixture.

Although each of the above embodiments of the present invention normally uses the ink in a liquid form, any types of ink which are liquid when the recording signal is applied can be used in the above-described ink jet recording method. Ink which solidifies at room temperature and less and softens or becomes a liquid at room temperature is known and may be used in the above-described ink jet recording, and the temperature of the ink used is controlled within the range of from 30° C. to 70° C. so that the viscosity of the ink is within the range of stable discharge. In addition, a temperature rise caused by thermal energy is positively prevented by using thermal energy as energy for changing the state of the ink used from a solid state to a liquid state, or ink which solidifies when being allowed to stand is used for preventing evaporation of the ink. The present invention can also be applied to a case which uses ink that is liquefied by the thermal energy applied thereto corresponding to the recording signal and discharged as an ink droplet or ink that starts to solidify before it reaches the recording medium used. In any case, the ink used has the property that it does not liquify unless thermal energy is applied thereto. In such a case, the ink used may be held as a liquid or solid in pores or through holes of a porous sheet and placed opposite to an electrothermal converter, as disclosed in Japanese Patent Laid-Open Nos. 54-56847 and 60-71260. The present invention is most effective for the ink when the above-described film boiling method is performed.

What is claimed is:

1. An ink jet apparatus comprising:

an ink jet head including a discharge port surface having a port having walls forming an angle $\alpha$ at which ink forms a meniscus and an energy generator for generating energy to discharge ink from a discharge port for recording, wherein some of the ink discharged from said discharge port for recording may adhere to said discharge port surface as unwanted ink droplets, each droplet having an edge forming an angle $\Theta$ with said discharge port surface, wherein $\alpha > \pi - 2\Theta$; and control means for controlling said energy generator to project the meniscus from said port and spread ink onto said discharge port surface to envelope unwanted ink droplets which adhere to said discharge port surface in the vicinity of said discharge port, wherein the ink spread onto said discharge port surface is sucked into said port to remove any unwanted ink droplets adhered to said discharge port surface.

2. An ink jet apparatus according to claim 1, wherein said ink jet head has a plurality of said ports, including a recording discharge port for discharging ink as a droplet for recording and a dummy discharge port having said walls for spreading ink therefrom to envelope and remove unwanted ink droplets.

3. An ink yet apparatus to claim 2, wherein a plurality of said recording discharge ports are disposed in a line, and a plurality of said dummy discharge ports are disposed along said line.

4. An ink jet apparatus according to claim 2, wherein a plurality of said recording discharge ports are disposed in a line and at least one said dummy discharge port is disposed at each end of said line.

5. An ink jet apparatus according to claim 2, wherein said ink jet head has an ink chamber communicating with said recording discharge port and said dummy discharge port.

6. An ink jet apparatus according to claim 2, wherein said ink jet head has a first ink chamber communicating with said recording discharge port and a second ink chamber communicating with said dummy discharge port.

7. An ink jet apparatus according to claim 2, wherein removal of ink droplets adhering to said discharge port surface is performed by said dummy discharge port between consecutive drivings of said energy generator for recording.

8. An ink jet apparatus according to claim 1, wherein said ink jet head has a plurality of said ports, and said control means drives the energy generator corresponding to at least one of said ports to project the meniscus therefrom at a predetermined time relative to a timing of ink discharge for recording.

9. An ink jet apparatus according to claim 1, wherein the meniscus is projected from said port at a home position of a carriage carrying said ink jet head.

10. An ink jet apparatus according to claim 1, wherein the meniscus is projected from said port when said ink jet head is in a region wherein said ink jet head discharges ink for recording.

11. An ink jet apparatus according to claim 1, wherein the meniscus is projected from said port each time a predetermined amount of recording is completed by said ink jet head.

12. An ink jet apparatus according to claim 11, wherein the predetermined amount of recording comprises a predetermined number of lines.

13. An ink jet apparatus according to claim 11, wherein the predetermined amount of recording comprises a predetermined number of sheets.

14. An ink jet apparatus according to claim 1, wherein said control means exhausts through said discharge port the ink sucked into said port.

15. An ink jet apparatus according to claim 14, wherein said sucked ink is exhausted from said discharge port to a cap for covering said discharge port.

16. An ink jet apparatus comprising:

an ink jet head including a discharge port surface having a port at which ink forms a meniscus and an energy generator for generating energy to discharge ink from a discharge port for recording, wherein some of the ink discharged from said discharge port for recording may adhere to said discharge port surface as unwanted ink droplets; and control means for controlling said energy generator to project the meniscus from said port and spread ink onto said discharge port surface to envelope unwanted ink droplets which adhere to said discharge port surface in the vicinity of said discharge port, wherein the ink spread onto said discharge port surface is moved to a position separate from said discharge port after enveloping the unwanted ink droplets.

17. An ink jet apparatus according to claim 1, wherein a plurality of said ink jet heads are provided corresponding to different ink color tones.

18. An ink jet apparatus according to claim 1, wherein said energy generator is an electrothermal converter for generating thermal energy.

19. An ink jet apparatus according to claim 1, wherein said energy generator is a piezoelectric element.

20. An ink jet apparatus according to claim 1, wherein said control means controls said energy generator to project the meniscus from said port by varying the width of a driving pulse applied to said energy generator.

21. An ink jet apparatus according to claim 20, wherein the width of the driving pulse applied to said energy generator to project the meniscus from said port is within the range of 40% to 80% of the width of the driving pulse applied to said energy generator for discharging ink for recording.

22. An ink jet apparatus according to claim 1, wherein said control means controls said energy generator to protect the meniscus from said port by changing the voltage of a driving pulse applied to said energy generator.

23. An ink jet apparatus according to claim 22, wherein the voltage of the driving pulse applied to said energy generator to project the meniscus from said port is within the range of 50% to 90% of the voltage of the driving pulse applied to said energy generator for discharging ink for recording.

24. An ink jet apparatus according to claim 1, wherein said control means controls said energy generator to project the meniscus from said port by changing the frequency of a driving pulse applied to said energy generator.

25. An ink jet apparatus according to claim 24, wherein the frequency of the driving pulse applied to said energy generator to project the meniscus from said port is within the range of 110% to 190% of the frequency of a driving pulse applied to said energy generator for discharging ink for recording.

26. An ink jet apparatus comprising:

an ink jet head with a discharge port surface having a recording discharge port for discharging ink as a droplet for recording, an energy generator for generating energy utilized to discharge ink as a droplet from said recording discharge port, wherein some of the ink discharged from said discharge port for recording may adhere to said discharge surface as unwanted ink droplets, and a dummy discharge port, at which ink forms a meniscus, for removing unwanted ink droplets which adhere to said discharge port surface;

a movable carriage carrying said ink jet head; and an ink supply tube for supplying ink to said dummy discharge port, the meniscus of ink at said dummy discharge port being vibrated by a variation in the pressure of the ink in said ink supply tube caused by the movement of said carriage to project the meniscus from said discharge port, wherein ink is spread onto said discharge port surface to envelope and remove the unwanted ink droplets adhering to said discharge port surface in the vicinity of said recording discharge port.

27. An ink jet apparatus according to claim 26, further comprising a second ink supply tube for supplying ink to said recording discharge port through a sub-tank.

28. An ink jet apparatus according to claim 16, wherein moving the ink to a position separate from said discharge port removes ink droplets from the vicinity of said discharge port.

* * * * *

UNITED STATES PATENT AND TRADEMARK OFFICE

CERTIFICATE OF CORRECTION

PATENT NO. : 5,355,158

DATED : October 11, 1994

INVENTOR(S) : GENJI INADA, ET AL.

It is certified that error appears in the above-identified patent and that said Letters Patent is hereby corrected as shown below:

ON TITLE PAGE

In [57] ABSTRACT:
Line 2, "in" should read --an--.
Line 3, "car," should read --can--.

COLUMN 1

Line 40, "a%" should read --at--.

COLUMN 4

Line 6, "must" should read --mist--.
Line 12, "view" should read --views--.
Line 15, "view" should read --views--.
Line 30, "invent ion;" should read --invention;--.
Line 34, "a" should be deleted.
Line 49, "17(c)" should read --17(d)--.

COLUMN 5

Line 18, "pore" should read --port--.

COLUMN 6

Line 4, "project" should read --projects--.
Line 16, "1b" should read --15--.
Line 61, "pore" should read --port--.

COLUMN 7

Line 26, "to" should be deleted.
Line 48, "ports;" should read --ports--.

UNITED STATES PATENT AND TRADEMARK OFFICE
CERTIFICATE OF CORRECTION

PATENT NO. : 5,355,158

DATED : October 11, 1994

INVENTOR(S) : GENJI INADA, ET AL.

It is certified that error appears in the above-identified patent and that said Letters Patent is hereby corrected as shown below:

COLUMN 7

Line 50, "corresponding" should read --corresponding to--.
Line 53, "corresponding" should read --corresponding to--.

COLUMN 8

Line 58, "pots" should read --ports--.
Line 60, "34" should read --31, 34--.
Line 64, "2 9," should read --29,--.

COLUMN 9

Line 1, "or" should read --of--.
Line 22, "2 6" should read --26,--.
Line 40, "pore" should read --port--.
Line 51, "port." should read --port--.

COLUMN 10

Line 38, "pores" should read --ports--.
Line 40, "26" should read --27--.
Line 67, "29" should read --29,--.

COLUMN 11

Line 31, "butler" should read --buffer--.
Line 52, "ink" should read --ink to--.
Line 57, "pore" should read --port--.
Line 59, "my" should read --by--.

UNITED STATES PATENT AND TRADEMARK OFFICE

CERTIFICATE OF CORRECTION

PATENT NO. : 5,355,158

DATED : October 11, 1994

INVENTOR(S) : GENJI INADA, ET AL.

It is certified that error appears in the above-identified patent and that said Letters Patent is hereby corrected as shown below:

COLUMN 12

Line 18, "pores" should read --ports--.
Line 67, "view" should read --views--.

COLUMN 13

Line 15, "state $T_4$ second" should read --state, time $T_4$--.
Line 32, "54" should read --54'--.
Line 33, "satellite 56" should read --satellite droplets 56--.
Line 37, "has;" should read --has--.
Line 54, "states $T_7$" should read --states, time $T_7$--.
Line 56, "disappears," should read --disappear,--.

COLUMN 14

Line 35, "of" should read --or--.
Line 63, "droplens" should read --droplets--.

COLUMN 15

Line 56, "in" should read --it--.

COLUMN 16

Line 24, "staining" should read --staining,--.

COLUMN 17

Line 21, "Plu-" should read --plu- --.
Line 57, "and" (first occurrence) should read --or-- and "or" should read --and--.

UNITED STATES PATENT AND TRADEMARK OFFICE

CERTIFICATE OF CORRECTION

PATENT NO. : 5,355,158

DATED : October 11, 1994

INVENTOR(S) : GENJI INADA, ET AL.

It is certified that error appears in the above-identified patent and that said Letters Patent is hereby corrected as shown below:

COLUMN 18

Line 29, "the" should read --a--.
Line 41, "yet apparatus" should read --jet apparatus according--.

COLUMN 19

Line 36, "the" should read --a--.

COLUMN 20

Line 48, "the" should read --a--.

Signed and Sealed this

Twenty-first Day of March, 1995

Attest:

BRUCE LEHMAN

Attesting Officer

*Commissioner of Patents and Trademarks*